(12) United States Patent
Weir et al.

(10) Patent No.: US 7,630,989 B2
(45) Date of Patent: Dec. 8, 2009

(54) TRANSACTION MANAGEMENT SYSTEM

(75) Inventors: John Meredith Weir, Jindabyne (AU); Michael Prior, Wahroonga (AU); Tony Antoun, Greenacre (AU); Nee Hon Ng, Beecroft (AU); Todd Venning, Artarmon (AU); Arie Budhihardjo, Hurstville (AU)

(73) Assignee: Colonial First State Investments Ltd., Sydney (AU)

( * ) Notice: Subject to any disclaimer, the term of this patent is extended or adjusted under 35 U.S.C. 154(b) by 112 days.

(21) Appl. No.: 10/991,091

(22) Filed: Nov. 17, 2004

(65) Prior Publication Data

US 2005/0182774 A1 Aug. 18, 2005

Related U.S. Application Data

(63) Continuation of application No. PCT/AU03/00594, filed on May 19, 2003.

(30) Foreign Application Priority Data

May 17, 2002 (AU) ........................... PS2398
Aug. 12, 2002 (AU) ............................. 2002950735

(51) Int. Cl.
*G06F 7/00* (2006.01)
*G06F 17/00* (2006.01)
(52) U.S. Cl. ............................... 707/100; 707/6
(58) Field of Classification Search .............. 707/1–10, 707/100–104.1, 200–206; 705/30, 35; 706/47; 709/217, 219; 715/229, 716–726
See application file for complete search history.

(56) References Cited

U.S. PATENT DOCUMENTS 5,517,406 A 5/1996 Harris et al.

(Continued)

FOREIGN PATENT DOCUMENTS

AU 199729315 11/1997

(Continued)

OTHER PUBLICATIONS

Yun-Huan Chou et al., Greedy file-a new data organization concept for partial match retrieval, Sep. 20-22, 1989, IEEE, 263-270.*

(Continued)

*Primary Examiner*—Jean B Fleurantin
(74) *Attorney, Agent, or Firm*—Schwegman, Lundberg & Woessner, P.A.

(57) ABSTRACT

The invention relates to a computer-based method of and system for matching a set of transaction instructions received from a submitting entity with a record data set of receiving entity. The record data set includes a plurality of account records and an associated match key data set comprising a plurality of match keys, wherein each match key identifies an associated account record. The method comprises searching the match key data set using a match key derived from a received funds transfer instruction to identify an account record in said record data set thereby automatically matching said instruction to said identified record. The submitting entity selects a particular unmatched record of said data set, thereby manually matching said instruction to said selected record. Updating of the match key data set with the derived match keys of manually matched records enables later instructions providing substantially identical match keys to be automatically matched to their associated records in the account record data set.

34 Claims, 39 Drawing Sheets

U.S. PATENT DOCUMENTS

| | | | |
|---|---|---|---|
| 5,659,731 A * | 8/1997 | Gustafson | 707/4 |
| 6,029,146 A * | 2/2000 | Hawkins et al. | 705/35 |
| 6,247,000 B1 * | 6/2001 | Hawkins et al. | 705/37 |
| 6,691,103 B1 * | 2/2004 | Wozny | 707/2 |
| 2002/0026416 A1 * | 2/2002 | Provinse | 705/39 |
| 2002/0107794 A1 | 8/2002 | Furphy et al. | |
| 2003/0001703 A1 | 1/2003 | Blecks et al. | |
| 2005/0182774 A1 | 8/2005 | Weir et al. | |

FOREIGN PATENT DOCUMENTS

| | | |
|---|---|---|
| AU | 199734727 | 11/1997 |
| JP | 10-307966 | 11/1998 |
| WO | WO-9829983 A1 | 7/1998 |
| WO | WO-9832260 A1 | 7/1998 |
| WO | WO-9833296 A1 | 7/1998 |
| WO | WO-9854631 A2 | 12/1998 |
| WO | WO-9926177 A1 | 5/1999 |
| WO | WO-0028487 A2 | 5/2000 |
| WO | WO-0242952 A1 | 5/2002 |

OTHER PUBLICATIONS

Djeraba et al., Retrieve of images by content, Nov. 4-5, 1996, IEEE, 261-267.*

"Search Report for International Application No. PCT/AUO3/00594", (Jun. 27, 2003), 2 pgs.

* cited by examiner

Online contributions

Contribution File Library                           [?] Help on this transaction Your previously submitted superannuation contribution files are in the table below, the most recent first. Each file has a unique identification number, and the current status of the file and the date and time the file was first submitted to Colonial First State are also shown.

For more information on the possible file statuses please click on 'Help with this transaction' to the right.

If you are authorised to submit a new file you will see the 'Upload file' link on the left side of your screen. For more information about uploading files or authorisation see the 'Help with this transaction' link to the right.

Select 'Previous' and 'Next' to see more of your files in the table.

Click on an action to access the file.     Print this page for your records [P]

| File ID# | Date | Time | Status | Action |
|---|---|---|---|---|
| 2663 | 20/10/2001 | 12:35pm | Approved | Awaiting funds |
| 2662 | 20/9/2001 | 12:35pm | Complete | View details |
| 2661 | 20/8/2001 | 12:35pm | Complete | View details |
| 2660 | 20/7/2001 | 12:35pm | Complete | View details |
| 2659 | 20/6/2001 | 12:35pm | Complete | View details |
| 2658 | 20/5/2001 | 12:35pm | Complete | View details |
| 2657 | 20/4/2001 | 12:35pm | Complete | View details |
| 2656 | 20/3/2001 | 12:35pm | Complete | View details |
| 2655 | 20/2/2001 | 12:35pm | Complete | View details |
| 2554 | 20/1/2001 | 12:35pm | Complete | View details | previous    54-63 next

[?] Help Topics    Why has the file I uploaded not appeared in the table?
Why can't I upload a file?
How can I see the file I have uploaded?

Terms of Use | Protecting your Privacy

*FIG. 6*

Online contributions

Contribution File Library     [*i*] Help on this transaction

Your file has been validated and now appears on the first line of the table below. Where possible, the records have been matched to investor accounts in our system. Before the file can be accepted by Colonial First State, all the submitted contribution records must be accounted for.

Click on the 'Confirm File' action next to your file details and proceed with matching the contribution records and investor accounts.

If you need help please select the 'Help with this transaction' link to the right on this page.

Click on an action to access the file.     Print this page for your records [P]

| File ID# | Date | Time | Status | Action |
|---|---|---|---|---|
| 2664 | 20/11/2001 | 12:35pm | Validated | Confirm file |
| 2663 | 20/9/2001 | 12:35pm | Approved | Awaiting funds |
| 2662 | 20/8/2001 | 12:35pm | Complete | View details |
| 2661 | 20/7/2001 | 12:35pm | Complete | View details |
| 2660 | 20/6/2001 | 12:35pm | Complete | View details |
| 2659 | 20/5/2001 | 12:35pm | Complete | View details |
| 2658 | 20/4/2001 | 12:35pm | Complete | View details |
| 2657 | 20/3/2001 | 12:35pm | Complete | View details |
| 2656 | 20/2/2001 | 12:35pm | Complete | View details |
| 2655 | 20/1/2001 | 12:35pm | Complete | View details | previous     54-64 next

[*i*] Help Topics     Why has the file I uploaded not appeared in the table?
Why can't I upload a file?
How can I see the file I have uploaded?

Terms of Use | Protecting your Privacy

*FIG. 7*

Online contributions

Contributions File Upload      Step 1 of 3     [i] Help on this transaction

It is easy to submit a superannuation contribution file to Colonial First State. There are three simple steps and you will be guided through the process. For more help with this transaction please click the 'Help with this transaction' button on the right side of this page.

You must tell us which file you wish to upload. Use 'Browse' to find the file on your disk or, if you know the name and location of the file, you may type it directly into the box.

Then click 'Upload' to submit the file.

Please note:

* A file must be submitted in the agreed format. If you are unsure of this format or have any questions please call Colonial First State on XXXXXX'.

* If you have already submitted a file you must proceed with the confirmation of this file and receive a Contributions Receipt Number for it before submitting a new file.

81          82

[                      ]    [ BROWSE ]   [ SUBMIT ]

[i] Help Topics      Why has the file I uploaded not appeared in the table?
                        Why can't I upload a file?
                        How can I see the file I have uploaded?

Terms of Use | Protecting your Privacy

| Online contributions | | |
|---|---|---|
| Upload contributions: Confirm File | Step 2 of 3 | *i* Help on this transaction |

Your file 1234 was submitted with 98 records on 23/01/2002 at 09:35am. — 93

Your file has been validated for data errors and the records matched to existing investor accounts. The results are shown in the box to the right.

Before the file can be confirmed, all records must be either:

- Matched to an investor's account, or
- Ignored from this contribution file and resubmitted.

Then all records will appear in the 'Your instructions' box.

We are unable to process the records shown in the table below because they have data errors. After reviewing all the records, select 'Ok' below the table to remove these records from the file and continue with the remaining records. Don't forget to print this page for your records.

Alternatively you may reject the entire file by clicking the 'Reject file' button to the right, fix the errors offline and resubmit the file. If the total number of records with data errors represents a large percentage of the total records submitted, we suggest you reject the file.

| Your results are: | |
|---|---|
| To be resolved | |
| Un-matched | 6 |
| Completed | |
| Matched | 90 |
| Ignored | 0 |
| Data errors | 2 |
| Payment details | |
| Payable | $7,869 |
| Available funds | $1,000 — 40 |
| Balance due | $6,869 |
| Save & exit | Reject file |

Click next or previous to view all records    Print this page for your records [P]

| Record No. | Account No. | Payroll No. | Surname | First name | DOB | |
|---|---|---|---|---|---|---|
| 068 | | 5634 | Muhler | Jane | 04/19/1964 | 91 |
| Contribution type not allowed | | | | | | |
| 021 | Invalid data | 4885 | Jam301 | | | |

Previous 1-2 next

Click OK to remove these records and continue with the remaining file    [ OK ] — 92

*i* Help Topics

Terms of Use | Protecting your Privacy

| Online contributions | | |
|---|---|---|
| Upload contributions: Confirm File | Step 2 of 3 | [i] Help on this transaction |

Your file 1234 was submitted with 98 records on 23/01/2002 at 09:35am.

Your file has been validated for data errors and the records matched to existing investor accounts. The results are shown in the box to the right.

Before the file can be confirmed, all records must be either:

- Matched to an investor's account, or
- Ignored from this contribution file and resubmitted.

Then all records will appear in the 'Your instructions' box.

Since we were not able to find investor accounts to match some of the records in your file you will now have to:

| Your results are: | |
|---|---|
| To be resolved | |
| Un-matched | 6 |
| Completed | |
| Matched | 90 |
| Ignored | 0 |
| Data errors | 2 |
| Payment details | |
| Payable | $7,869 |
| Available funds | $1,000 |
| Balance due | $6,869 |
| Save & exit | Reject file |

— 40

- Match the records to a existing investor account by searching for the investor yourself, or
- Set-up new accounts for these investors, or
- Ignore these records (you will need to resubmit them) and continue with the remaining records.

Select an action to the right of the record       Print this page for your records [P]

| Record No. | Payroll No. | Surname | First Name | DOB | Action | | |
|---|---|---|---|---|---|---|---|
| 011 | 6839 | Partridge | Lorraine | 07/05/1956 | new | match | ignore |
| 056 | 5694 | Lawrence | Thomas | 25/07/1994 | new | match | ignore |
| 072 | 9295 | Terry | Steve | 08/05/1956 | new | match | ignore |
| 079 | 6920 | Kaynes | Peter | 31/11/1974 | new | match | ignore |
| 081 | 2053 | Valditov | Harry | 31/01/1976 | new | match | ignore |
| 083 | 3564 | Alexander | Fiona | 28/03/1971 | new | match | ignore |

— 101
— 104
— 103

102                                                                 Previous

[i] Help Topics                                                      105

Terms of Use | Protecting your Privacy

| Online contributions | |
|---|---|
| Upload contributions: Match to existing accountStep 2 of 3 | [i] Help on this transaction |

Your file 1234 is Validated with 98 records on 23/01/2002 at 09:35am.

You have elected to manually match this record to an existing Colonial First State account. The details of the record are displayed below. Use the form below to search all the accounts that exist for your Plan.

If you are unable to find a match for the record, click 'Back' and you will be returned to the 'Un-matched' table. From there you may pick another option for this record.

| Your results are: | |
|---|---|
| To be resolved | |
| Un-matched | 6 |
| Completed | |
| Matched | 90 |
| Ignored | 0 |
| Data errors | 2 |
| Payment details | |
| Payable | $7,889 |
| Available funds | $1,000 |
| Balance due | $6,869 |
| [Save & exit] [Reject file] | |

Below is the record you are attempting to match.      Print this page for your records [P]

| Un-matched records details | | | | |
|---|---|---|---|---|
| Record No. | Surname | First Name | DOB | Payroll No. |
| 011 | Partridge | Lorraine | 07/05/1956 | |

Search results: 25 possible account matches found

| | Surname | First name | DOB | Account No. | match |
|---|---|---|---|---|---|
| 121 | Lopez | Alex | 08/08/1997 | 4839-848093 | match |
| | Jones | Lorne | 23/09/1972 | 8283/899033 | match |
| | Partridge | Loraine | 07/0/1956 | 8933/495933 | match |
| | Heeley | David | 04/24/191 | 5939/203049 | match |
| | Kazel | Harry | 05/11/1963 | 9343-523433 | match |

122  You may search using on investor name, date of birth (dd/mm/yyyy) or the Investor's 123
Colonial First State account number

| Search for record | | |
|---|---|---|
| | Lo | [Search] |

Return to un-matched table   [Back]

124
[i] Help Topics

Terms of Use | Protecting your Privacy

| Online contributions | | | |
|---|---|---|---|
| Upload contributions: Confirm | | 2 of 3 | [i] Help on this transaction |

Your file 1234 is Validated with 98 records on 23/01/2002 at 09:35am.

You can view the matched records from your file in the table below.

Select next or previous to view all records. If you find an incorrectly matched record, you may 'Un-match' the record by selecting the action link to the right. The record will become an 'Un-matched' record and appear in the box to the right.

When you have finished reviewing your matched records select 'Continue' to proceed with adjusting your file records.

[Continue]

| Your results are: | |
|---|---|
| To be resolved | |
| Un-matched | 6 |
| Completed | |
| Matched | 90 |
| Ignored | 0 |
| Data errors | 2 |
| Payment details | |
| Payable | $7,869 |
| Available funds | $1,000 |
| Balance due | $6,869 |

[Save & exit] [Reject file]

Print this page for your records [P]

| Contribution Record | | | | Colonial First State Account | | Action |
|---|---|---|---|---|---|---|
| Record No. | Payroll No. DOB | Surname First name | Acc No. | Acc No. DOB | Surname First | |
| 001 | 8485 16/05/1966 | Dwyer James | | 2343-52323 16/05/1966 | Dwyer James | Unmatch |
| 002 | 2733 05/10/1966 | Henry Phil | | 2343-73453 <DOB> | Henry Phil | Unmatch |
| 003 | 1923 01/09/1974 | Clarke Heath | | 1325-96345 01/09/1974 | Clarke Heath | Unmatch |
| 004 | 5833 28/08/1975 | Frith Julia | | 3452-57343 28/08/1975 | Frith Julia | Unmatch |
| 005 | 1923 10/06/1971 | Kerry Peta | | 6324-62422 10/06/1971 | Kerry Peta | Unmatch |
| 006 | 6342 30/11/1982 | Miles Mike | | 7344-72342 30/11/1982 | Miles Mike | Unmatch |
| 007 | 6232 22/12/1984 | Freke Goule | | 0233-34532 22/12/1984 | Freke Goule | Unmatch |
| 008 | 7344 10/07/1981 | Selvester Kerry | | 7433-32235 10/07/1981 | Selvester Kerry | Unmatch |
| 010 | 2342 01/12/1975 | Nowles Lorrie | | 7340-34532 01/12/1975 | Nowles Lorrie | Unmatch |

Previous 1- 10 next

[i] Help Topics

Terms of Use | Protecting your Privacy

| Online contributions | | | |
|---|---|---|---|
| Upload contributions: Confirm file | | 2 of 3 | [i] Help on this transaction |

Your file 1234 is Validated with 58 records on 23/01/2002 at 09:35am.

The Ignored records for this file are displayed below. These records will be extracted from this contribution file upload and will not be processed when the file is confirmed.

Ignored records can be 'Un-done' and will return to the 'Un-matched' state. You can then choose another option for these records.

When you are satisfied with your ignored records click 'Continue to proceed.'

[Continue]

| Your results are: | |
|---|---|
| To be resolved | |
| Un-matched | 3 |
| Completed | |
| Matched | 90 |
| Ignored | 3 |
| Data errors | 2 |
| Payment details | |
| Payable | $7,869 |
| Available funds | $1,000 |
| Balance due | $6,869 |
| [Save & exit] [Reject file] | |

Print this page for your records [P]

| Ignored records | | | | | | |
|---|---|---|---|---|---|---|
| Record No. | Account No. | Payroll No. | Surname | First name | DOB | Action |
| 054 | | 9522 | Lawrence | Harry | 01/06/1976 | Un-do |
| 082 | | 6064 | Poole | Jane | 23/08/1981 | Un-do |
| 071 | | 1624 | Millet | Ryan | 10/03/1971 | Un-do |

Previous 1- 3 next

[i] Help Topics    [Continue]

Terms of Use | Protecting your Privacy

| Make a contribution | |
|---|---|
| Payment required | Step 3 of 3 |

[i] Help with this transaction

Your file <file ID> is was submitted with <submitted records> records on <file date> at <file time>.

Your contribution file has been accepted however your contribution is not complete until payment has been received.

161

Please note your contribution receipt number.

Contribution Confirmation Number: <CCN>

Your confirmed file will be held for 28 days from the date of submission shown above.

162 — To complete the transaction we must receive the balance due, $<balance> within this time.

You currently hold a direct debit facility with Colonial First State. Please check the payable balance below and add additional funds if required. Select 'Next' to proceed with the payment.

| Your results are: | |
|---|---|
| To be resolved | |
| Un-matched | <count> |
| Completed | |
| Matched | <count> |
| Ignored | <count> |
| Data errors | <count> |
| Payment details | |
| Payable | $<pay amt> |
| Available funds | $<Cl acct amt.> |
| Balance due | $<balance> |
| Save & exit | |

Direct debit payment option    163    Print this page for your records [P]

Contribution payment

Funds to be debited from

| BSB: | <pc bank acct bsb> | Bank: | <pc bank> |
| Account: | <pc bank acct number> | Branch: | <pc bank address> |

| Balance due | $ <balance> |
| Additional amount | $ <additional amount> |
| Total contribution | $ <total DD amount> |

To proceed with this transaction please click 'Next'.

162    [Reset]  [Next]

164         166         165         167

Alternative payment options are shown below.

| BPay | Direct Credit |
|---|---|
| [B PAY] Amount: <balance><br>Biller code: <biller code><br>Ref. number: <ref number> | Amount: <balance><br>BSB: <bsb><br>Acc. No.: <cl. acct number><br>Ref: <CCN> |

[i] Help Topics

*FIG. 16A*    160

Make a contribution

Payment required                                          Step 3 of 3

*i* Help with this transaction

Your file <file ID> is was submitted with <submitted records> records on <file date> at <file time>.

Your contribution file has been accepted however your contribution is not complete until payment has been received.

Please note your contribution receipt number.

Contribution Confirmation Number: <CCN>

Your confirmed file will be held for 28 days from the date of submission shown above.

To complete the transaction we must receive the balance due, $<balance> within this time.

You currently hold a direct debit facility with Colonial First State. Please check the payable balance below and add additional funds if required. Select 'Next' to proceed with the payment.

| Your results are: | |
|---|---|
| To be resolved | |
| Un-matched | <count> |
| Completed | |
| Matched | <count> |
| Ignored | <count> |
| Data errors | <count> |
| Payment details | |
| Payable | $<pay amt> |
| Available funds | $<Cf acct amt.> |
| Balance due | $<balance> |
| Save & exit | |

Direct debit payment option                     Print this page for your records [P]

Contribution payment

Funds to be debited from

BSB:       <pc bank acct bsb>        Bank:     <pc bank>
Account:   <pc bank acct number>     Branch:   <pc bank address>

We have received your request to make your contribution payment

Details of transaction:        Your transaction reference number is <TRN>

Deposit of payment of employer superannuation contribution funds to Colonial First State FirstChoice Employer Super requested by <username> on <dd date> at <dd time>.

Balance due          $ <balance>
Additional amount    $ <additional amount>
Total contribution   $ <total DD amount>

We recommend you print this record of your transaction.                    169$

Alternative payment options are shown below.

| BPay | Direct Credit |
|---|---|
| Amount: <balance> | Amount: <balance> |
| Biller code: <biller code> | BSB: <bsb> |
| Ref. number: <ref number> | Acc. No.: <cf. acct number> |
| | Ref: <CCN> |

*i* Help Topics

*FIG. 16C*

| Make a contribution | |
|---|---|
| Payment required | Step 3 of 3 |

[i] Help with this transaction

Your file <file ID> is was submitted with <submitted records>records on <file date> at <file time>.

Your contribution file has been accepted however your contribution is not complete until payment has been received.

Please note your contribution receipt number.

Contribution Confirmation Number: <CCN>

Your confirmed file will be held for 28 days from the date of submission shown above.

To complete the transaction we must receive the balance due, $<balance> within this time.

You currently hold a Direct Debit facility with Colonial First State. Please request a user authorised to make payment to do so.

~171

| Your results are: | |
|---|---|
| To be resolved | |
| Un-matched | <count> |
| Completed | |
| Matched | <count> |
| Ignored | <count> |
| Data errors | <count> |
| Payment details | |
| Payable | $<pay amt> |
| Available funds | $<Cl acct amt.> |
| Balance due | $<balance> |
| Save & exit | |

Direct debit payment option                     Print this page for your records [P]

| Contribution payment | | | |
|---|---|---|---|
| Funds to be debited from | | | |
| BSB: | <pc bank acct bsb> | Bank: | <pc bank> |
| Account: | <pc bank acct number> | Branch: | <pc bank address> |

Alternative payment options are shown below.

| BPay | Direct Credit |
|---|---|
| Amount: <balance> | Amount: <balance> |
| Biller code: <biller code> | BSB: <bsb> |
| Ref. number: <ref number> | Acc. No.: <cl. acct number> |
| | Ref: <CCN> |

[i] Help Topics

| FIC155M1 | Match Key Conversion | Date: 21/08/2002 |
| 001-EMMA | Plan Payroll Centres | Time: 15:54:39 |
| | | Page: 1_ of 1 |

Employee No.    15891714 TODDS TEST EMPLOYER
Plan Number:    002428 TODDS TEST EMPLOYER STAFF SUPER FUND

| Pay Ctr. | Pay Centre Description | Pay Bur. | Cmt Account No. |
|---|---|---|---|
| S 001 | ACNLYONE | | 082-154-10201438 |
| _ 002 | PNIFNUNIQUE | | 082-154-10201439 |
| _ 003 | CNONE | | 082-154-10201440 |
| _ 004 | PNDMANY | | 082-154-10201441 |
| _ 005 | CSFDONLY | | 082-154-10201442 |
| _ 006 | PNSFDMANY | | 082-154-10201443 |
| _ 007 | CNDONE | | 082-154-10201444 |
| _ 008 | PSFDMANY | | 082-154-10201445 |
| _ 009 | CNSFDONE | | 082-154-10201446 |

Next Function : _____

Enter-PF1—PF2—PF3—PF4—PF5—PF6—PF7—PF8—PF9—PF10—PF11—PF12
        Back Main                              Start         Cancel

*FIG. 18a*

```
FIC821M1            Match Key Conversion              Date:  21/06/2002
001-EMMA                                              Time:  16:00:43

Pay Centre ID                    :      002428001
TSO Conversion Dataset Name.:
       FMS.CPNY001.CS.M002428.CV001.Dyymmdd_____
Update FMS (Y/N)................:      N
New Match Method................:      SF Report Dest : _____          Next Function : _____
Enter-PF1--PF2--PF3--PF4--PF5--PF6--PF7--PF8--PF9--PF10-PF11--PF12
HELP FHELP         Back                                     Cancl
```

| Contribution file | | | | |
|---|---|---|---|---|
| File ref | Data | Match key | A/C number | Match status |
| 456 | XXX$$$ | | | |

FIG. 31

| Contribution file | | | | |
|---|---|---|---|---|
| File ref | Data | Match key | A/C number | Match status |
| 456 | XXX$$$ | AA | | |

| FMS Account | |
|---|---|
| | |
| A/C Number | 101 |
| Match key | AA |
| Surname | |
| First name | |
| Address | |

TRANSACTION MANAGEMENT SYSTEM

RELATED APPLICATIONS

This application is a continuation under 35 U.S.C. 111(a) of International Application No. PCT/AU03/00594 filed May 19, 2003 and published in English as WO 03/098494 A1 on Nov. 27, 2003, which claims priority from Australian Application No. PS 2398 filed May 17, 2002, and Australian Application No. 2002950735 filed Aug. 12, 2002, which applications and publication are incorporated herein by reference.

COPYRIGHT NOTICE/PERMISSION

This patent document contains material which is subject to copyright protection. The copyright owner has no objection to the facsimile reproduction by anyone of the patent document as it appears in patent office records once publicly available, but otherwise reserves all copyright rights whatsoever. The following notice applies to the software and data as described and illustrated below: Copyright 2002, 2003, Colonial First State Investments Ltd, All rights reserved.

FIELD OF THE INVENTION

This invention relates to a system and method for managing transactions, one particular use of which is in facilitating the allocation of a plurality of fund transactions to a plurality of investor accounts. Further, the invention relates to reconciling two potentially mismatched data sets such that instructions derived from a first data set can be accurately transacted on a second data set. A preferred embodiment of the invention relates to administering superannuation contribution payments from employers into accounts managed by a funds manager.

BACKGROUND OF THE INVENTION

One of the main problems associated with the administration of superannuation and similar funds is that a multiplicity of relatively small contributions from investors need to be directed accurately into a corresponding multiplicity of investor accounts on a regular and ongoing basis. Typically, a responsible officer within an organisation, eg a payroll officer, provides a single payment to the superannuation fund administrator along with details of how the payment is to be split amongst the individual superannuation accounts of the employees of the organisation. A large number of mismatches typically exist, due to regular changes occurring to the details of both the individual investors and their accounts. Superannuation fund administrators have traditionally accepted the onerous responsibility of resolving these issues as one of the costs associated with the overall benefit of being the default funds manager.

In some cases superannuation fund administrators have initiated electronic services to assist in their submission of contribution files. Some allow contribution files containing detailed transaction instructions simply to be emailed in a specified format. Others have begun to develop more sophisticated internet-based systems which provide a "web form" for use by the employer to make contribution data entries. Generally, third party applications are utilised, with the result that they are not integrated closely with core computer systems that support superannuation fund administration. Current implementations of these systems are also prone to error such as investor duplication and error handling by exception reporting and manual resolution processes. Whilst these represent an improvement over a manual off-line approach, the superannuation administrator ultimately bears responsibility for resolving these issues once the file has been accepted.

In addition, the manner in which the reconciliation process occurs may itself tend to negatively affect the integrity of the data being reconciled.

SUMMARY OF THE INVENTION

According to a first aspect of the invention there is provided a computer-based method of matching a set of instructions received from a submitting entity with a record data set of a receiving entity, said record data set including a plurality of records and an associated match key data set comprising a plurality of match keys, wherein each match key identifies an associated record, the method comprising the steps of:

searching said match key data set using a match key derived from a received instruction to identify a record in said record data set thereby automatically matching said instruction to said identified record;

for at least a non-automatically matched instruction, enabling said submitting entity to select a particular record of said record data set, thereby manually matching said instruction to said selected record;

using the match key derived from a manually matched instruction to update the match key data set for facilitating the subsequent automatic matching of a received instruction to the selected record.

Preferably, the updating of the match key data set with the derived match keys of manually matched records enables later instructions providing substantially identical match keys to be automatically matched to their associated records in the record data set.

Conveniently, the step of enabling manual matches to be made by the contributing entity is enabled for instructions that are automatically matched in order that the contributing entity may override or mismatch matches that have been automatically matched to allow subsequent manual matching to take place.

Advantageously, the method includes updating the match key data set independently of the other records in the record data set such that any data fields of a record data set other than a match key field remain substantially unaltered.

The method may include updating any other records of a record data set independently of the match key data set such that updating of the record data set does not effect the subsequent automatic matching of received instructions with said records.

Typically, a match key associated with a record is stored as a field of the respective record such that the match key data set comprises the match key fields of the data set records, with the match key data set being updated by storing a copy of said derived match key in said match key field of said manually matched record.

The method preferably includes the step of creating a match key for a particular set of instructions using a predetermined match key rule associated with the particular set of instructions whereby predetermined data element fields in the instruction are combined to arrive at the match key.

Multiple sets of instructions are typically processed, with each instruction set having an associated match key rule specifying the data element fields in the instruction to be combined, the method including deriving the match keys in each instruction within in an instruction set using the match key rule for that set.

Conveniently, in the event of a match key rule being introduced or modified for a particular instruction set, the match key rule is written to a new rule for the corresponding match key data set, and a new set of match keys is generated to make up the new match key data set.

The method may include the step of creating at least some of the match keys in the match key data set by writing match keys derived from the received instructions into the match key data set.

Advantageously the method includes generating and presenting to the submitting entity at a user interface instruction status details, including a list of matched and unmatched instructions, for enabling the submitting entity to commence remote manual matching of instructions.

Preferably, the method includes enabling all records to be removed from the "unmatched" category to a completed category during the manual matching process, said completed category including matched and ignored categories, and preventing the instruction set from being accepted for further processing until all records have been removed from the "unmatched" category.

The method may include the step of identifying data errors in the set of instructions and automatically removing those instructions in respect of which data errors exist from the instructions to be matched.

Typically, the match key data set further comprises a plurality of match key association rules, individual ones of said match key association rules defining a relationship between a match key derived from an instruction and a match key associated with a record, wherein the match key data set is updated by storing an updated association rule between said derived match key and said match key associated with said matched record.

Conveniently, the method includes prompting said submitting entity to provide search criteria, automatically searching said data set to determine one or more records matching criteria provided by said submitting entity, and prompting said submitting entity to select a record from said determined records.

Where an instruction is matched to a record selected by said submitting entity, the method may further comprise deleting from said match key data set an association of said derived match key with a data set record other than the selected record.

The set of instructions may be submitted in a format characteristic of the particular submitting entity, the method including converting the set of instructions into a format compatible with the record data set in accordance with a set of mapping rules defined by the characteristic format of the submitting entity, prior to the match keys being derived.

The mapping rules may be variable in response to variations in format made by the submitting entity.

The set of instructions may be in the form of payment instructions for making multiple payments, the record data set is a set of accounts into which the payments are to be made on a regular basis.

In one form of the invention, the method includes calculating in real time the balance due in respect of an aggregate of matched accounts on the basis of available funds and enabling payment of said balance to be made.

The invention further provides a method of matching a first transaction instruction data set received from a submitting entity on a second data set at a receiving entity, said transaction instruction data set containing a plurality of transaction instructions, said second data set comprising a plurality of records and an associated match key data set, the method comprising the steps of:
  deriving a plurality of match keys from said corresponding transaction instructions;
  automatically searching said second data set using said derived match keys to identify corresponding records in said second data set thereby matching said selected instructions to said records;
  where no record is automatically identified for a received instruction, enabling said submitting entity to select a record of said data set to manually match to said instruction; and
  implementing the transaction instructions on those records that have been manually and automatically matched.

Conveniently, a match key derived from a manually matched instruction is used to update the match key data set, to enable later instructions providing substantially identical match keys to be automatically matched to their associated records in the record data set.

The invention extends to computer readable media containing program code, the program code being operative to instruct at least one programmable processor to execute any of the methods as set out above.

According to a still further aspect of the invention there is provided a system for matching a set of instructions received from a submitting entity with a record data set of a receiving entity, said record data set including a plurality of records, the system including:
  a match key data set comprising a plurality of match keys, wherein each match key identifies an associated record in the record data set:
  match key derivation means for deriving a match key from an instruction;
  a search engine for searching said data set using said derived match key to identify a record in said record data set thereby automatically matching said instruction to said identified record;
  selection means for enabling said submitting entity to select an instruction and manually match it to a selected record; and
  updating means for using a match key derived from a manually matched instruction to facilitate subsequent automatic matching of an instruction with a record in the record data set.

Preferably, the selection means includes means for enabling overriding or mismatching of matches that have been automatically matched to allow subsequent manual matching to take place.

Conveniently, the updating means includes means for updating the match key data set with the derived match keys of manually matched records to enable later instructions providing substantially identical match keys to be automatically matched to their associated records in the record data set.

Advantageously, the updating means includes means for updating the match key data set independently of the other records in the record data set such that any data fields of a record data set other than a match key field remain substantially unaltered, and means for updating any other records of a record data set independently of the match key data set such that updating of the record data set does not effect the subsequent automatic matching of received instructions with said records.

The system may include a memory for storing a match key associated with a record as a field of the respective record such that the match key data set comprises the match key fields of the data set records, with the match key data set being updated by storing a copy of said derived match key in said match key field of said manually matched record.

Processing means are preferably provided for processing multiple sets of instructions, and storage means are provided for storing each instruction set and an associated match key rule specifying the data element fields in the instruction to be combined for that instruction set.

Conveniently, the system includes match key rule writing means for enabling a match key rule to be written to a new rule for the corresponding match key data set in the event of a match key rule being introduced or modified for a particular instruction set, and match key generation means for generating a new set of match keys to make up a new match key data set.

The system may include means for creating at least some of the match keys in the match key data set by writing match keys derived from the received instructions into the match key data set.

The selection means may include means for generating and presenting to the submitting entity at a user interface instruction status details, including a list of matched and unmatched instructions, for enabling the submitting entity to commence remote manual matching of instructions.

The selection means may include means for enabling all records to be removed from the "unmatched" category to a completed category during the manual matching process, said completed category including matched and ignored categories, and means for preventing the instruction set from being accepted for further processing until all records have been removed from the "unmatched" category.

The search engine may include means for prompting said submitting entity to provide search criteria, means for automatically searching said data set to determine one or more records matching criteria provided by said submitting entity, and means for prompting said submitting entity to select a record from said determined records.

Means may be provided for enabling the deletion from said match key data set of an association of said derived match key with a data set record other than the manually selected record.

Conveniently, the system includes a data transformation engine for transforming a set of instructions in a format characteristic of a particular submitting entity into a format compatible with the record data set in accordance with a set of mapping rules determined by the format of the submitting entity.

Means may be included for varying the mapping rules in response to variations in format made by the submitting entity.

Conveniently, the set of instructions is in the form of payment instructions for making multiple payments, and the record data set is a set of accounts into which the payments are to be made on a regular basis.

The system may include means for calculating in real time the balance due in respect of an aggregate of matched accounts on the basis of available funds and means for enabling payment of said balance to be made.

According to a yet further aspect of the invention there is provided system for matching a set of instructions received from a remote submitting entity with a record data set of a receiving entity, said record data set including a plurality of records, the system including:

means for storing said record data set and a record match key data set comprising a plurality of match keys, wherein each match key identifies an associated record in the record data set:

match key derivation means for deriving an instruction match key from an instruction;

a search engine for searching said match key data set using said derived match key to identify a record in said match key record data set and to automatically match said instruction to said identified record;

server means for outputting to the submitting entity an interactive user interface enabling said submitting entity to select an instruction and manually match it to a selected record, said interactive user interface including instruction status details; and updating means for using a match key derived from a manually matched instruction to facilitate subsequent automatic matching of an instruction with a record in the record data set.

The invention still further provides a system for matching a set of instructions received from a remote submitting entity with a record data set of a receiving entity, said record data set including a plurality of records, the system including:

a record management system for managing said data set, said record management system including record storage means for storing said record, and an associated record match key data set comprising a plurality of match keys, wherein each match key identifies an associated record in the record data set;

match key derivation means for deriving an instruction match key from an instruction;

a search engine for searching said match key data set using said derived match key to identify a record in said match key record data set and to automatically match said instruction to said identified record;

server means for outputting to the submitting entity an interactive user interface enabling said submitting entity to select an instruction and manually match it to a selected record, said interactive user interface including instruction status details.

The system may be a funds transfer system, the set of instructions being in the form of funds transfer instructions, and the record management system comprising a funds management system, the system including a funds transfer protocol gateway for managing the transfer of funds into the funds management system.

The funds transfer system may include a data transformation engine for transforming data flowing between the remote submitting entity and the find management system, whereby the remote submitting entity is able to implement funds transfer instructions in real time.

The system may be in the form of a product ordering system, wherein the relationship between the set of instructions and the record data set may be a one to one, one-to-many and/or many-to-one relationship.

Throughout the specification, except where the context requires otherwise due to express language or necessary implication, the word "comprising" is used in the sense of "including", ie the features specified may be associated with further features in various embodiments of the invention.

BRIEF DESCRIPTION OF THE DRAWINGS

FIG. 6 shows a typical screen layout summarising online contribution files;

FIG. 7 shows a similar screen layout to that of FIG. 5 with the addition of a new validated file;

FIG. 8 shows a screen layout illustrating the steps involved in uploading a contributions file;

FIG. 9 shows a typical screen layout during the confirmation process illustrating two records having data errors;

FIG. 10 shows a typical screen layout of the confirmation process illustrating a number of un-matched files;

FIG. 12 illustrates a further step in the matching process illustrating the results of a search for possible account matches;

FIG. 13 shows a typical screen layout in a first step in the confirmation process for enabling confirmation of all matched records;

FIG. 14 shows a typical screen layout illustrating a further step in the confirmation process dealing with the processing of ignored records;

FIG. 15 shows a typical screen layout of a final confirmation step in the confirmation process;

FIGS. 16a to 16c show typical screen layouts of a three step payment process using a direct debit facility;

FIG. 17 shows a typical screen layout for instructing the user to provide authorised payment;

FIGS. 18a and 18b show screen layouts illustrating the match key updating process;

FIG. 30 shows a transaction log in an initial state before an automatic matching process;

FIG. 31 shows a transaction log after a match key has been derived from an instruction;

DETAILED DESCRIPTION OF THE EMBODIMENTS

A preferred embodiment of the invention will now be described relating to the processing of superannuation contributions into investor accounts. In a workplace, it is often a requirement of the employer to make payments, for example superannuation contributions, insurance payments and the like, on behalf of the employees. This requires payments to be made into a plurality of employee accounts and in the present invention is typically conducted by the payroll officer of the contributing entity or through a pay bureau, by submitting a transaction file containing a plurality of transaction instructions for processing by the system to enact the transaction instructions.

The overall approach of the present invention is to assume that the user at the contributing entity is responsible for and empowered to resolve any transaction problems before the contribution file is finally accepted by the fund administration system of the receiving entity for allocation of the specified contribution amounts into the specified investor accounts.

Transaction files containing instructions that cannot be reconciled with the system database, preferably in real time, are returned to the submitting entity before the submitting entity receives acknowledgment that the file has been accepted for final processing and allocation of the transaction instructions to the investor accounts.

Examples where a transaction instruction may be unable to be reconciled with the system database includes where the contribution data specifies an investor unknown to the system or where a contribution type has been inappropriately specified.

Figure 1:
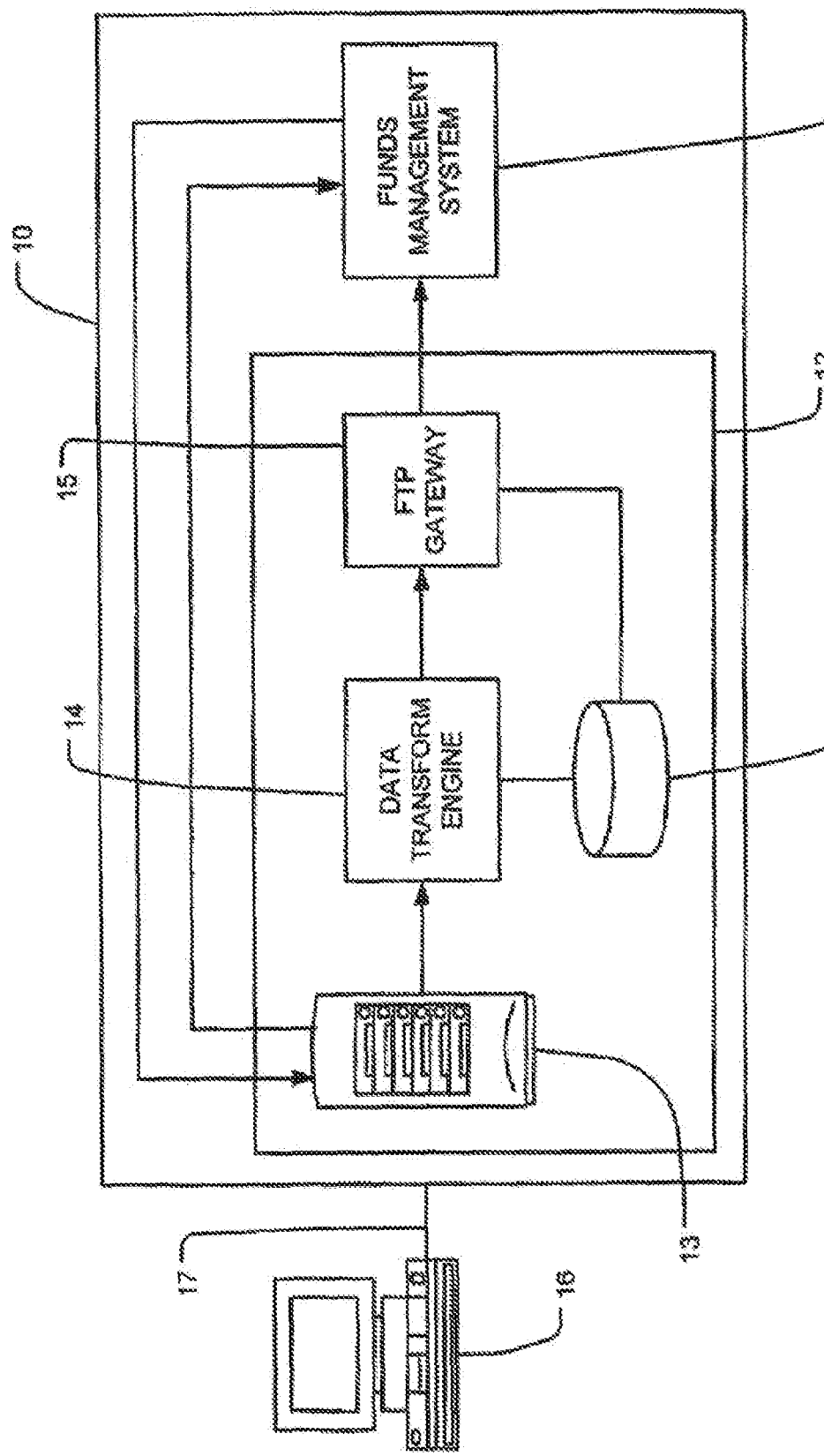
FIG. 1 shows a schematic block diagram of a system for implementing a funds matching and transfer system of the present invention.

Referring first to FIG. 1, there is schematically shown system architecture 10 on which a preferred embodiment of the invention may be implemented. The system 10 comprises two main components, namely a Fund Management System (FMS) 11 and a File Management Gateway (FMG) 12. The FMG 12 comprises an application server 13, a data transformation engine (DTE) 14 and a finds transfer protocol (FTP) gateway 15. The application server 13 provides the front end interface to a user terminal 16 through a telecommunications link 17 using known internet protocols. The FTP gateway 15 provides back end communication with the FMS 11. The DTE 14 transforms data, either received from the user or from the FMS and processes the data for communication through the system, eg to the FMS or to the user. The DTE utilises information such as subscription lists, tracking information and associated components, which are stored in a database 18 linked to the DTE. The FTP gateway 15 also links to the database 18.

The terms fund management system and fund administration system as used herein are used in the context of management and administration of accounts, ie as opposed to the management of money and investment of that money in commodities.

In use, the applications server 13 outputs a client interface onto remote terminal 16, for example using Active Server Pages (ASPs) in a known manner. A user accessing the system can transmit a transactions data file containing transaction instructions for a plurality of investors, further details of which will are set out below. The transaction file may be submitted by the user in one of a plurality of formats. Typically, the format is agreed with the user as part of an initialisation or registration procedure, which format is stored in the database 18. This can be varied from time to time at the behest of the contributory entity.

The FMG 12 receives generic transaction files through the application server 13 which are passed to the DTE 14 which converts them into an FMS FlatFile format for internal communications to the FMS through the FTP gateway. Conversely, messages received from the FMS as a response to a call to an FMS program are converted into a format presentable to the user and transferred to the user through the application server 13.

Figure 2:
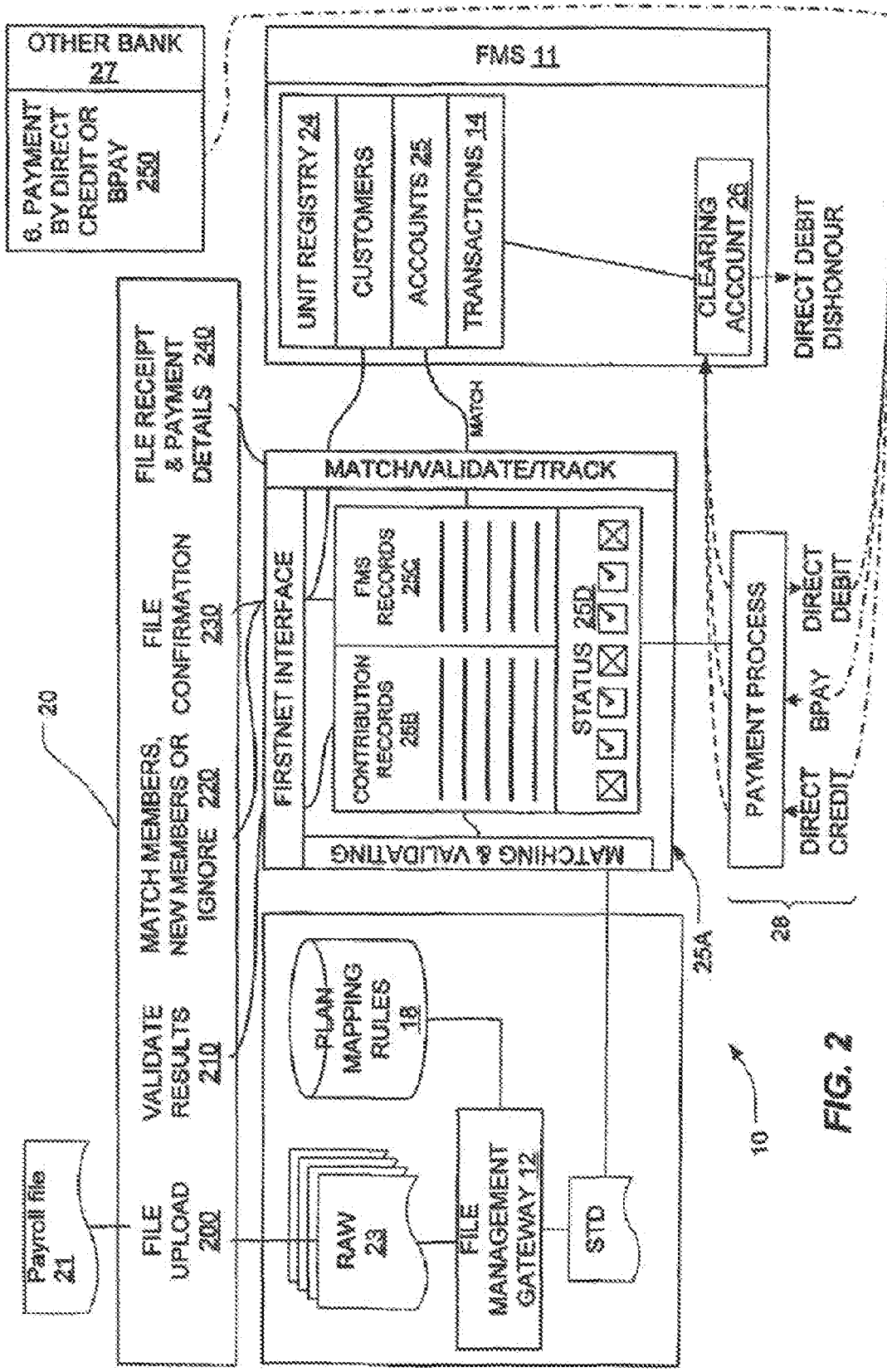
FIG. 2 shows a schematic block diagram of a funds matching and transfer system of the invention.

FIG. 2 shows a flow diagram 20 of the system processes in conjunction with a functional block diagram of the system components. In broad terms, a payroll file 21 created by a user, eg a payroll officer, is uploaded at step 200 from the user terminal as a raw transaction data file 23 to the FMG 12. The payroll file will typically be created as an output of the employer/paycentre payroll or HR management software which may for example include any known payroll or HR software package. Raw transaction data files 23 are processed by the FMG 12 in accordance with stored mapping rules stored in the database 18. The gateway 12 stores a copy of the original incoming raw file for future reference and audit purposes. Files converted by the FMG 12 into a standard format STD are passed to the FMS 11 where the instructions are logged in a transaction instruction register 24, after which the instructions undergo a two step matching process. The first step is an automatic validate step 210 in which an attempt is made by the system to reconcile instructions from transaction files with investor accounts 25 of the FMS 11. The second step 220 is a manual process in which the user who submitted the contribution payroll file selects investor accounts to match to the records that are unmatched after the automatic process. The user implements this through a client interface 25A on the remote terminal with the ASP's including list Contribution and FMS Records 25B and 25C for facilitating manual matching, and a status display 25D displaying the ongoing status of the matching process.

Once all unmatched records are resolved, the user confirms the file 230 whereafter matched transaction instructions are actioned by transacting a funds transfer 240 from a clearing account 26 of the FMS into the individual investor accounts 25. The system also allows for a payment step 250 in which the user can nominate a bank account 27 of the contributing entity from which funds can be provided, through a suitable e-commerce engine 28, to the clearing account 26 in order to meet contribution payments.

To commence the process, a user at a contributing entity accesses the system through the exchange server to commence an active session. The applications server provides an interface to the user. Through the interface, the user submits a transaction file in a known manner to the applications server which transfers the file to the FMG 12. Typically a raw transaction file will contain contribution data identifying the contributing entity, ie the employer or pay centre and the user, and a plurality of transaction instructions each specifying an investor and details of one or more contributions to be made into the investor account. Typical instruction fields will include Investor details:
 account number
 payroll number
 surname
 first name
 date of birth
Contribution details:
 Superannuation guarantee (SG) contribution
 Employer additional contribution
 Salary sacrifice (SS) contribution
 Investor voluntary contribution
 Spouse contribution The file management gateway 12 receives incoming raw files sent by a user, which are stored for future reference and audit purposes. The FMG database 18 stores plan mapping rules that inter alia specify expected file formats for contributing entities. When a contributing entity registers with the system a file format is agreed between the contributing entity and the system, which format is stored in the database 18.

A base assumption is that some combination of the investor details supplied in the transactions file can be used to establish a unique account identifier to be used in the matching of transaction instructions to investor accounts.

An incoming raw file is initially processed by the file management gateway 12 first to identify the contributing entity from the user login and then to determine if the file is in the expected format predetermined by the contributing entity. A further test determines if that contributing entity has any other pending files logged in the system, ie files that have not been finally confirmed or rejected. A failure on any of these tests will cause the transaction file to be rejected and an error message will be provided to the user at the contributing entity.

If the raw file is initially accepted, the mapping rules for the file format are retrieved from the database and applied to the file to convert the file into a standard FlatFile format for internal communications within the system.

It is preferred that raw transaction data files are uploaded by a user to the file management gateway 12 using a known online file transfer function. However, the system also encompasses providing an online form for the user to enter transaction instructions directly onto the system interface.

Once a transaction file has been received and converted to a standard internal format, the file data can be reconciled with system data stored in the FMS 11. The purpose of the reconciliation process is to match each incoming transaction instruction with an existing FMS investor account, to store that instruction in a pending file for payment reconciliation and to issue the contributing entity with a Contribution Confirmation Number (CCN). Thus, the contributing entity does not receive acknowledgment that the transactions data has been fully accepted for processing while the file is still pending.

The process also performs data validation on the transaction instructions. Where an instruction contains data errors identified during the validation process, the record will be rejected and the user notified of which instruction was in error and the type of error. The contributing entity will then be able to correct the error offline, ie outside of the active session, and resubmit the instruction as part of a new data file. The first stage in the reconciliation process is to derive from each instruction of the transaction file a match key to use as a look up tool for the FMS accounts. The match key is derived from two or more of the record fields. A base assumption is that the transaction instruction contains sufficient data to provide unique member identification. The rules for deriving the match key are established when the contributing entity first registers with the system and will typically be specific to the pay centre/employer. Part of the registration process is to analyse a sample employer superannuation transaction file and to develop an appropriate account identifier rule for the employer (pay centre). The account identifier will uniquely identify the investor account in the FMS and may be, for example, a combination of the following data elements: account number (A); payroll number (P); paycentre ID (C); surname(S); first name (F); date of birth (D).

The single letter codes for each field are used to define the match key rule as a maximum ten character field representing the appropriate data element combination. Thus a match key rule of

SDP would indicate a match key derived from the surname:date of birth:payroll number.

In the most preferred embodiment, the employer payroll system has the capacity to store employee FMS account numbers and thus the account number can be included as part of the transaction file and used in the match key derivation. If this is not possible, the file systems of the employer are analysed at the time of registration with the system to determine the most appropriate match key rule. As is described later on in the specification, the match key rule can be altered at any time.

Figure 3A:
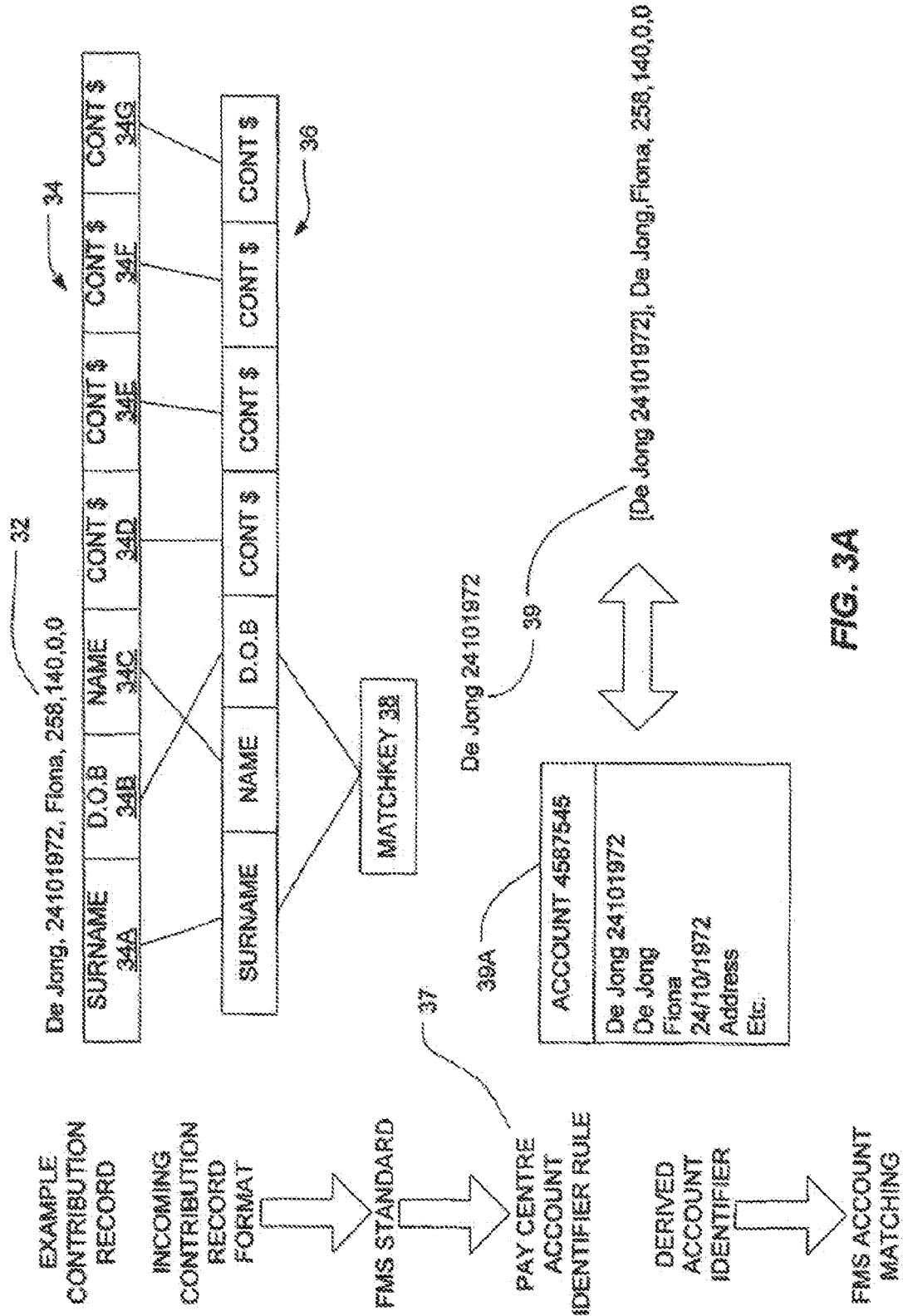
FIG. 3a shows a flowchart illustrating the automatic account matching process.

Referring now to FIG. 3A, there is shown the process for deriving a match key. A sample transaction instruction or contribution record 32 is extracted from the raw data file. The raw instruction format 34 including instructions identifier files 34A to 34C incorporating investor details and contribution files 34D to 34G incorporating fund contribution details ($258, $40, $0 and $0) is converted by the file management gateway to the FMS standard instruction format 36. The pay centre account identifier rule is obtained, eg from the DCM database, and used to derive the match key 38. In the example shown the match key rule would be "SD" and would produce the match key or derived account identifier 39. The derived account identifier is then used in searching the FMS accounts to determine if an account 39A matching the derived account identifier exists. It will be appreciated that the contribution details are prone to regular variation, and cannot be used for match key creation purposes.

The process is repeated for all instructions extracted from the transaction file. Instructions that can be matched to accounts in FMS are allocated a "matched" status and stored in a pending file for later payment reconciliation as will be discussed below. Unmatched instructions are given an "unmatched" status. Instructions containing data errors that cannot be resolved for FMS searching are given an "error" status, equivalent to an ignore status, and must be resubmitted by the contributing entity.

Figure 4:
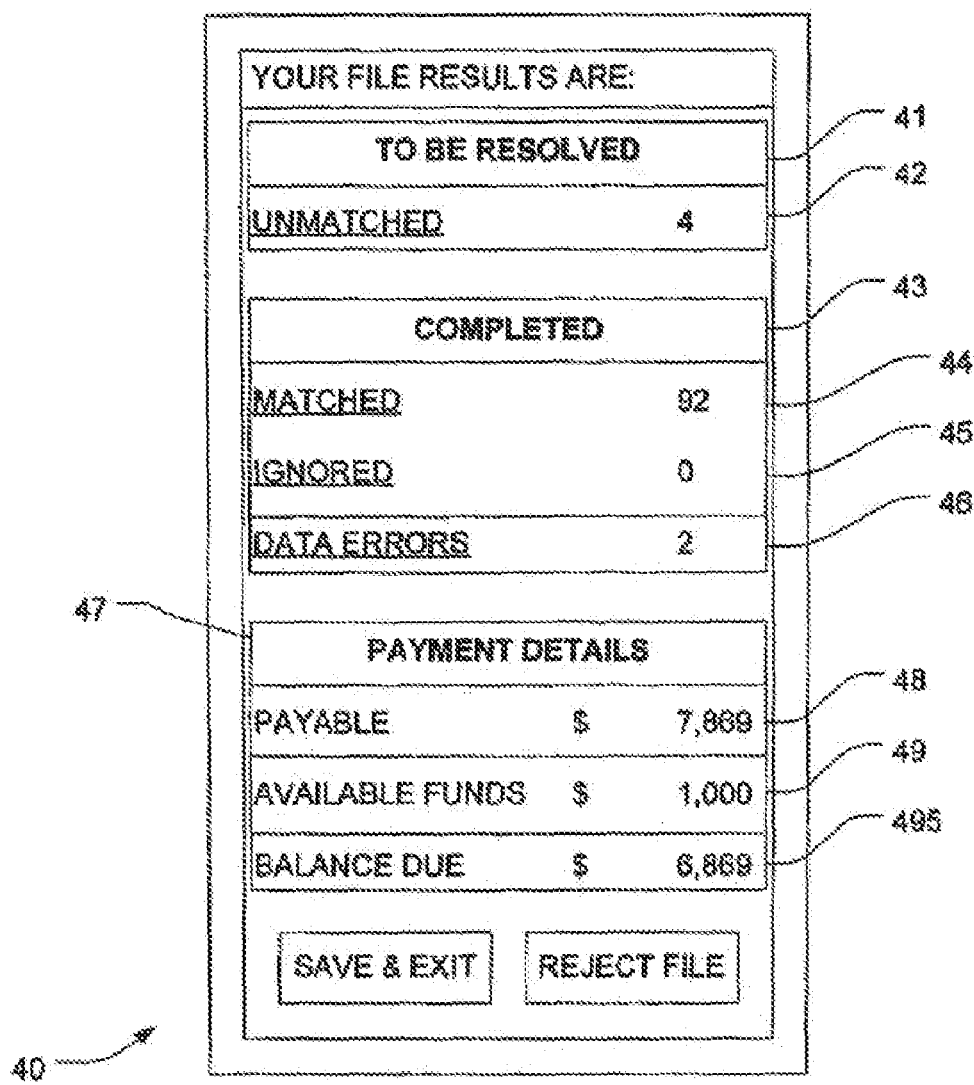
FIG. 4 shows part of a screen display illustrating typical file uploading results.

The instruction statuses are reported to the user of the contributing entity. It is preferred that the automatic reconciliation process occurs during the active session in which the transaction file is provided by the user in order that the user obtains a near immediate indication of whether the data file contains any unreconcilable data, in particular any instructions that cannot be enacted by the system, so that the user is not left with the impression that all instructions in the file will be enacted. The report is provided to the user in an online interactive format for example as shown in FIG. 4. The screen interface layout 40 includes three main portions. The upper portion 41 details the number of unmatched instructions 42 which are yet to be resolved. The middle portion 43 details the number of completed instructions, including the number of matched instructions 44, the number of ignored instructions 45 and the number of instructions containing data errors 46. The lower portion 47 of the screen layout 40 contains payment details including the total amount payable 48 as calculated from the contribution fields of the matched instructions, the available funds 49 as determined by polling a clearing account of the FMS, and the balance due 495 which is calculated as the difference between the amount payable and the available funds.

Initially, after the auto matching function is completed, all instructions will be shown in one of three places, namely "Unmatched", "Matched" or "Data errors". The sum of the numbers in these three places equals the total number of files. Instructions with data errors cannot be retrieved by the user and are excluded from the transaction file.

Once the automatic reconciliation process is complete and has been reported to the user, it is the user's goal to move the records from the unmatched "to be resolved" portion 41 to one of the categories in the middle "completed" portion 43. The transaction file will not be accepted until all records have been removed from the "Unmatched" category. In this way, there is no confusion as to the user's instructions to allocate funds to the investor accounts. The user is not provided with a Contribution Confirmation Number (CCN) at this stage, so that even if the active session is terminated, the receiving entity has not had confirmation of the transaction file instructions and thus bears no responsibility for allocating contribution payments to investor accounts. The manual reconciliation process may be undertaken by the user in several system access sessions, thus allowing the user to check unmatched data within the systems of the contributing entity.

In the embodiment described, automatically matched instructions are entered into the "Matched" section 44 of the completed portion 43 of the screen interface 40. In an alternative embodiment (not shown) the user is shown the automatically matched instructions in the upper section and is required to confirm the automatic match before those instructions are moved to the "Matched" section 44 of the completed portion 43.

The unmatched instructions may be selected by the user at the contributing entity to match an instruction to an existing account, to create a new account to match to an unmatched instruction, or to ignore an instruction. If the user matches an unmatched instruction, it appears in the middle completed portion as matched, the matched count increases by one and the unmatched count decreases by one. Similarly, if the user elects to ignore an unmatched instruction, the instructions appears in the ignored category and the "ignored" and "unmatched" tallies are appropriately adjusted. The interfaces for manually matching, ignoring or creating new accounts for unmatched instructions will be described in more detail below.

Figure 3B:
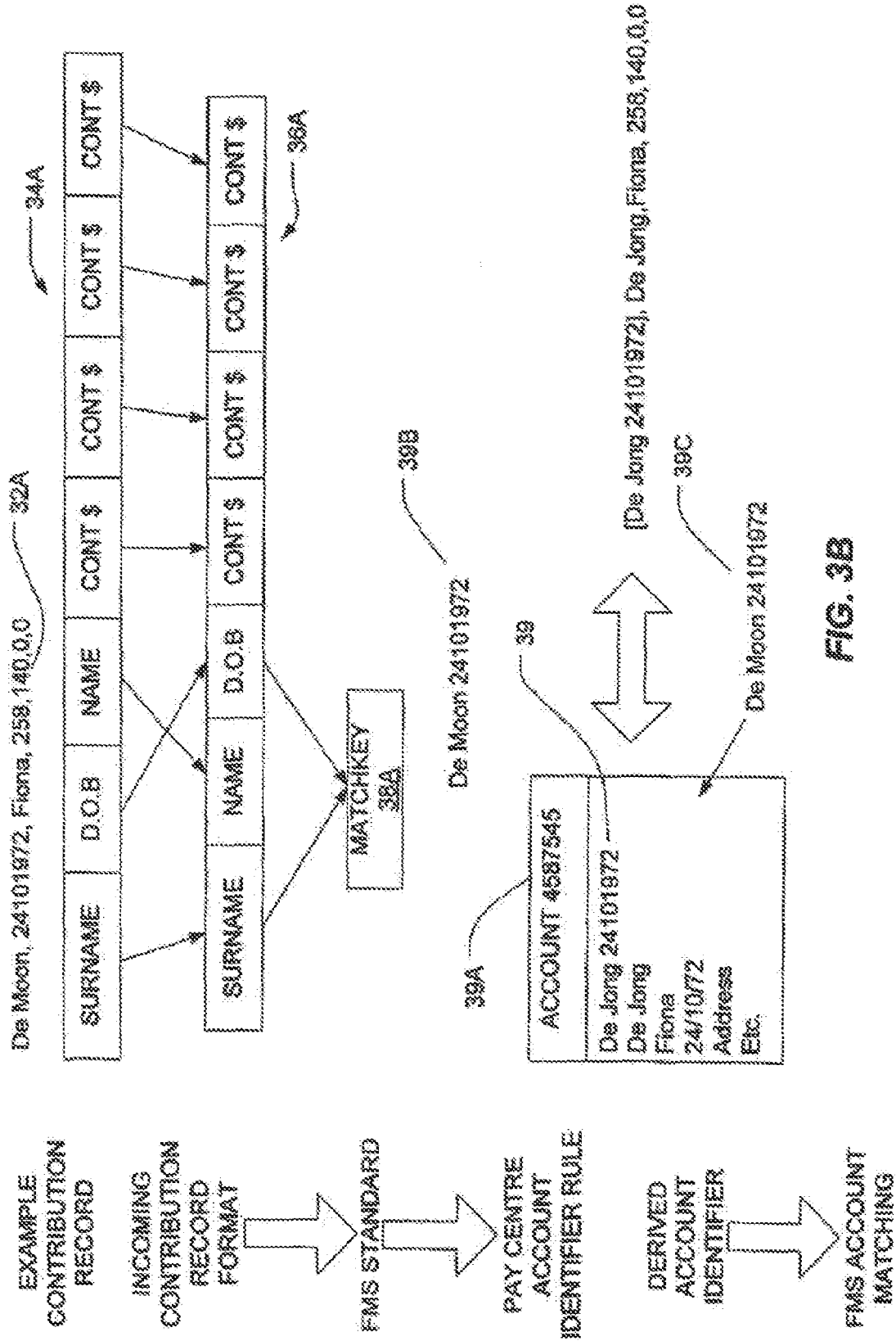
FIG. 3b shows a flowchart illustrating the manual account matching process.

In FIG. 3B, the process for deriving a match key is shown where there is an initial mismatch and manual matching occurs. The sample transaction instruction or contribution record 32A is identical to the preceding one, save that the surname has been changed to DeMoon. The match key 38A generated from using the SD match key rule produces the match key or derived account identifier "DeMoon24101972", as is shown at 39B. There will accordingly be a mismatch with the account 39A, where the account match key 39 is still DeJong 24101972. The account is manually matched with the match key 39B, and this results in the original match key 39 being overwritten with a match key which is at 39C which is identical to the match key 39B. As a result, for any file subsequently submitted which carries a record having the match key 39B, this will in future be automatically matched to the FMS account 39A having the altered match key 39C.

If other data in the FMS account 39A is changed, then this will have no effect on the matching process. For example, if the surname details are changed in this account, then the match key will remain identical and the contribution record 32A will still be matched automatically with the account 39A owing to the identical match keys 39B and 39C.

When the tally of unmatched instructions has been reduced to zero, the final step in the matching process is to request that the user confirms all matches made between contribution records and FMS accounts. During the confirmation step, the user may view all matched contribution instructions, including automatically matched instructions, and ignored instructions. Implicit in the contribution process is the ability to undo, eg unmatch, any instruction/FMS account match that has been made. Once the complete confirmation is made, a Confirmation Contribution Number is issued to the user after which the user may safely terminate the active session in the knowledge that the matched transaction instructions can be enacted by the system.

The confirmed transaction file is given a "Confirmed" status subject to a payment reconciliation process, which process need not be conducted entirely during the active session. The payment reconciliation process is responsible for receiving contribution payments, reconciling them against the confirmed transaction file, and passing the reconciled transaction instructions to the transactions processes in the FMS.

Figure 5:
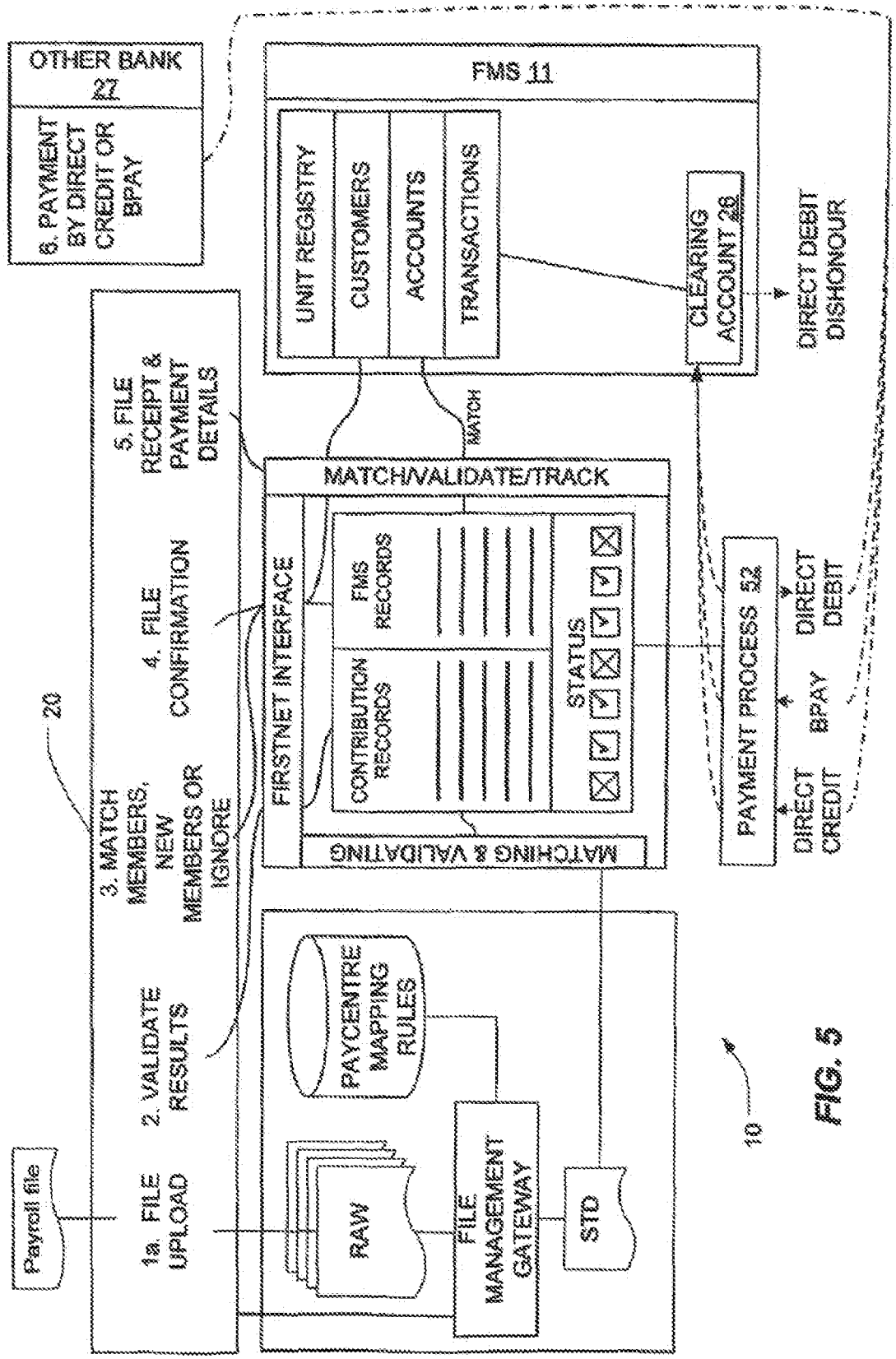
FIG. 5 shows a schematic block diagram of an account clearing process.

In the preferred embodiment, as is shown in FIG. 5, the payment reconciliation process utilises a notional clearing account 26 established in the FMS 11 which mirrors and is linked to a physical application account held at a financial institution 27. The application account may be split with separate "accounts" within the single application account being identified by an employer or pay centre ID. This allows a single application account to be used for all registered users of the system. For large employers having multiple pay centres, the employer will typically have one clearing account per pay centre.

A contributing entity can provide funds to the clearing account using known payment processes 52 such as BPay, Direct Debit or Direct Credit which are preferred as they are electronic processes, or may alternatively use more conventional processes such as by cheque deposit.

At a scheduled time, the payment reconciliation process receives a confirmed transaction file and checks the payment total of all contributions in the matched instructions of the file. The relevant clearing account in FMS is then checked to ensure that the pay centre has sufficient cleared funds to meet the payment amount and only when this requirement is met is the transaction file finalised. The process is completed with the passing of the transaction file to the FMS transaction process which enacts the transaction instructions by allocating the individual amounts specified in the instructions to the account specified.

Confirmed files are checked daily to determine whether sufficient funds have been deposited in the clearing account and confirmed files that are unfunded after a time period, eg 28 days, are changed to a void status and must be resent by the contributing entity and reprocessed. The system is established to prompt the contributing entity, eg by sending an auto-generated e-mail message to the user, to supply funds for a confirmed transaction file where the file has been pending for a period of time, eg at 10 and 20 days.

Funds that remain unallocated for a time period, eg 28 days, may be returned to the employer's or pay centre's nominated bank account.

For the embodiment described, the system does not require the contributing entity to have sufficient clear funds in the respective clearing account at the time the contributing entity confirms the contribution file. In an alternative embodiment, the system may dictate that funds covering the contribution payments must be available at the time of the active session so that all details of the contribution process can be confirmed during the active session. In this alternative embodiment, the interface may provide a payment system that prompts the user to supply payment information at the time of confirming the contribution file.

In a further alternative embodiment, payment may be made as part of the file submission and confirmation process. In this embodiment, the interface will include prompts to the user to enter account information or to confirm historical information previously stored for the contributing entity. This embodiment may use any one of known e-commerce engines used for facilitating on-line transactions. Once the user has confirmed the account details, the e-commerce engine can transfer funds from the nominated contributing entity account to the system clearing account prior to issuing the confirmation receipt number.

Referring now to FIG. 6, there is shown a sample screen layout of an interface provided to a user when a user first creates an active session. The screen 60 provides a transaction file library 61 of transaction files submitted by the contributing entity. The library lists the files identified by a File ID # 62, date of submission 63, time of submission 64, status 65 and an action required 66. As is shown in FIG. 6, the lead file 67 is the most recently submitted having a status of approved, ie confirmed but is awaiting funds. A user may select the action link to view the file details.

A second sample contribution library 70 is shown in FIG. 7. In this example, the lead file 71 is a submitted file that has been received and has undergone the auto-match procedure and has thus been "validated", as indicated in status field 75 but is awaiting confirmation and matching of unmatched instructions as indicated in the action field 76. A user may proceed to confirmation of the file by selecting the action field link The presence of a "validated" file will prevent that contributing entity from uploading further files to the system until the "validated" file is either confirmed or rejected. This helps to prevent the same instruction from being enacted twice.

In FIG. 8 there is shown a screen layout 80 for facilitating uploading of a transaction file. The screen 80 includes a browse button 81 which when selected allows the user to browse through the file system on the user interface in a known manner. A user submits a selected file using a submit button 82.

FIG. 9 shows a sample screen layout 90 for use in the record reconciling process. This screen is displayed after initial receipt of the transaction file and validating the file for data errors. Instructions having data errors are shown in box 91. By selecting the "OK" icon 92, the user can confirm that the instructions containing data errors will not form part of the transaction file. The box 40 detailing the results of the auto-match process previously described is displayed as part of this screen.

In order to proceed with confirmation of the transaction file, the user must match or ignore all unmatched instructions. By selecting the "un-matched" link 93 on screen 90, the user is taken to screen 100 as shown in FIG. 10. Box 40 continues to be displayed but new box 101 shows all the instructions that have not been matched. Each instruction is identified by the instruction number, and investor/employee details as derived from the instruction such as payroll number, name, date of birth etc, as an error in any of these details could have lead to the instruction not being matched with an account of the find administration system, depending on the composition of the match key. For any particular unmatched instruction 102, the user is given the option to ignore the instruction 103, match the instruction 104 or to create a new account 105 for the investor/employee, which processes will be described in greater detail below.

Figure 11:
FIG. 11 shows a typical screen layout of the confirmation process in which an attempt is being made to match an un-matched record with an existing account.

If the user selects to match an instruction, screen 110 of FIG. 11 is presented. The screen details the selected instruction 111 to be matched and provides a search tool interface 112 into which the user may enter search terms. The search is commenced when the user selects the "search" button 113. The search is conducted on all existing investor accounts corresponding to the relevant contributing entity. Search results are displayed on screen 120 in box 121 of FIG. 12. A located investor account 122 is listed with all relevant details such as name, date of birth, account number etc, to enable the user to decide if the account matches the as yet un-matched instruction. A match is made by selecting the "match" prompt 123 corresponding to the account. Further search terms can be entered in search box 124. If an account is selected to match to the instruction, the file results table 40 is updated accordingly and the system returns to screen 100 to enable the user to confirm the remaining unmatched instructions. Instructions that have been matched can be reviewed in a screen 130 of FIG. 13. No distinction is made between instructions that have been matched automatically by the system or manually by the contributing entity and accordingly screen 130 displays all matched instructions. A matched box 131 is displayed with one column 132 containing instructions and an adjacent column 133 containing the respective matched accounts. A user may select to unmatch an instruction by selecting the relevant unmatched icon 134 which will cause the unmatched tally of box 40 to increase by one.

Initially, an instruction will be unmatched as a result of there being no account in the system having an identical match key. When the user creates a match manually, the system may compare account fields with instructions fields and if a disparity is present, eg where the date of birth is not identical, the system may actively prompt the user for additional confirmation that the records are to be matched.

After the initial account set-up, the employee record details held by the employer payroll system and those held by FMS may diverge. For example, an employee may elect to change the spelling of their surname on the employer payroll system but not in the FMS system. In a further example, a recently married person may continue to use their maiden name at their place of employment, but change all financial accounts to their new married name. It is accordingly preferred that the employee records are not synchronised across both systems. However, where an amended detail is used in deriving the match key, a mismatch will occur. To prevent the mismatch re-occurring at subsequent file submissions, the match key of a manually matched account is updated with the new match key derived from the transaction instruction of the file. This ensures that future matches are automatically made without having to have complete identity between the record systems of the employer and the FMS as it is only the match key that is amended. The integrity of the data in the respective record systems is thus preserved. Updating of the match keys does not occur until the final confirmation of the transaction file, because up until this time, any matches can be unmatched.

If the "ignore" icon is selected from screen 100 (FIG. 10) for an unmatched record, the file record is moved to a list of ignored records as shown at box 141 of screen 140 in FIG. 14. The file results box 40 is updated accordingly. The user may "un-do" the ignoring of an ignored record 143 by selecting the "un-do" prompt 144, which returns the selected ignored record in the unmatched list. After confirmation, the system does not attempt to process contribution data from ignored records.

Where a transaction instruction has been provided for a new investor, eg a new employee of the contributing entity, there will be no match found. The user can request that a new account be established for the employee by selecting the "new" icon for the record from screen 100 (FIG. 10). The system will initiate the creation of a new account in the FMS using investor identification data provided by the contributing entity in an online form. Once the online form is submitted, an account having all necessary fields, eg investor identification, account number and match key fields, is created in the FMS account system. The unmatched instruction is then matched to the new account. On final confirmation of the file, the match key from the transaction instruction is written to the new account to allow subsequent matching of instructions pertaining to the new investor.

Figure 15:
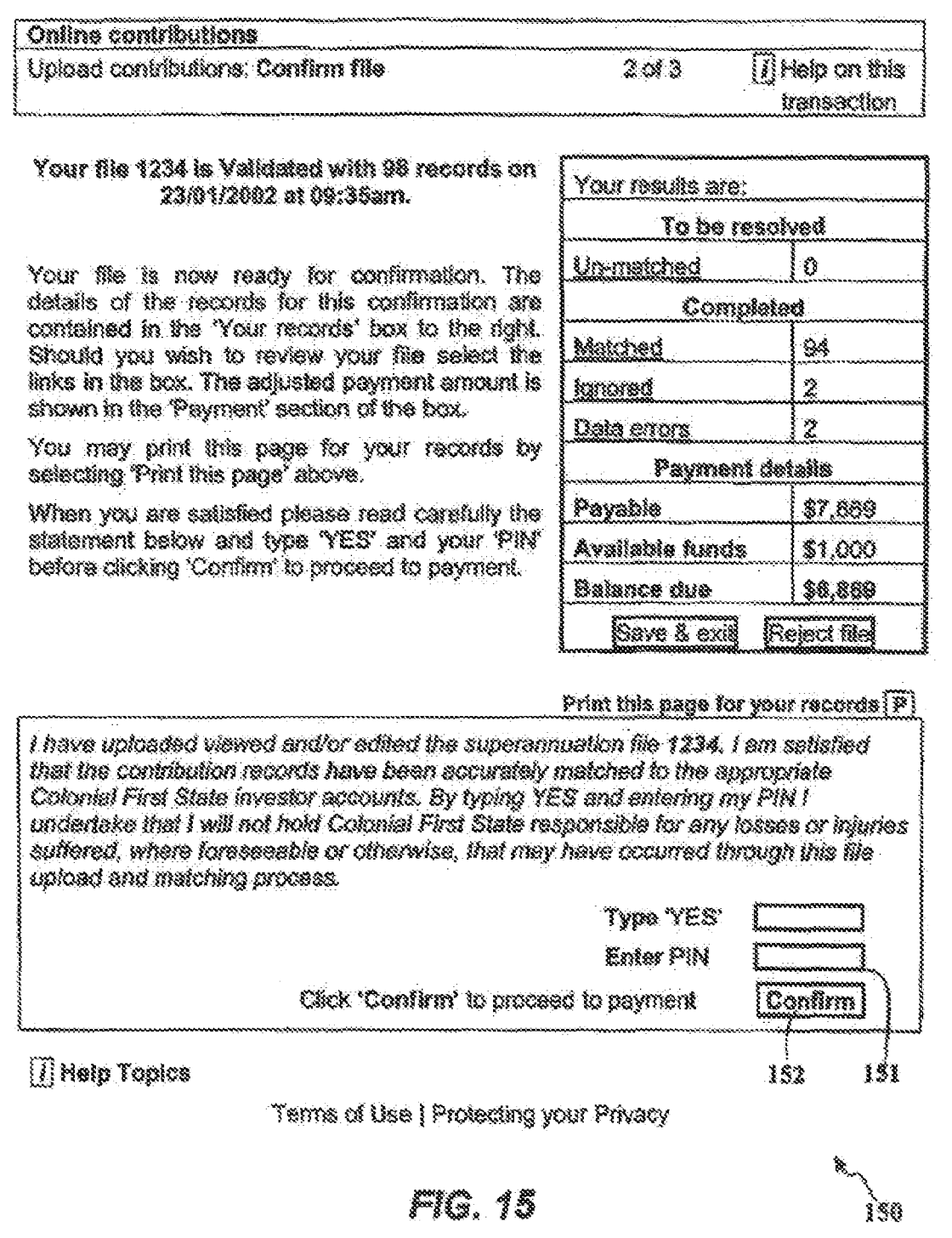

Once all unmatched instructions have been reconciled, either by matching, ignoring or creating a new account, the transaction file is ready for final confirmation and the user interface proceeds to screen 150 shown in FIG. 15. The user may still review any of the matched or ignored instructions but if no further actions are required, the user confirms the contribution file by entering a security code such as a Personal Identification Number (PIN) in box 151 and selects the "confirm" button 152. The PIN ensures that the user is an authenticated user of the contributing entity and of the system.

If the PIN is confirmed, the interface progresses to screen 160 of FIG. 16a, which informs the user on-line of a Contribution Confirmation Number (CCN) 161 and of balance due 162 to meet the matched contributions detailed in the transaction file. A Direct Debit payment option is provided in which the user is able to enter details of the account from which funds are to be debited, including the BSB, account no, bank and branch, as it shown at 163. Alternative BPay and Direct Credit options are shown at 164 and 165 respectively.

Figure 16B:

The user may optionally enter an additional amount to be paid into the clearing account to box 166, over and above the minimum balance due 162. This typically includes the amounts in the ignored records, which will generally be resolved in the next session. The "Next" button 167 is then selected to proceed with the payment. Referring now to FIG. 16B, the user is then promoted to provide a PIN in box 168 to confirm the user authority. The "submit" icon 169 is then selected to proceed with the payment. In the final step of FIG. 16C, receipt of the payment request is confirmed, and the user is provided with the transaction reference number 1695.

In the example shown, the payment details shown are for a Direct Debit facility but other payment facilities may be shown and will depend on the payment option historically chosen by the contributing entity. The above example further illustrates where the user has authority to make the payment. Alternatively, the user may not have authority to make payments on behalf of the contributing entity in which case the user is presented with screen 170 (FIG. 17) which instructs at 171 the user to request an authorised officer to make the payment within a 28 day deadline.

In many cases due to the change in the nature of raw data being submitted, the contributing entity such as the pay centre will want to change the way in which the match key is derived to uniquely identify each contributor, for example from surname and DOB to surname and payroll number. If no bulk match key change procedure is followed, there will be a mismatch on all records in the first file that is submitted. The pay centre initially provides a bulk match key file in the format illustrated below.

| Field Name | Format | Mandatory |
|---|---|---|
| Surname | A30 | Y |
| GivenName | A45 | Y |
| Date of Birth | A15 | Y |
| Unique payroll number | A15 | Y |
| FMS Account no. | A15 | Y |
| New Surname | A30 | Y |
| New GivenName | A45 | Y |
| New Date of Birth | A15 | Y |
| New Unique payroll number | A15 | |

The contributing entity saves the file as a tab delimited file, ensuring that all mandatory fields are completed, and that there are no commas in the numeric fields. All dates are converted to the YYYYMMDD format, and it is ensured that all columns are in the correct format and position. The a tab delimited file is uploaded to the funds transfer protocol gateway via the website. Upon receipt of the new file, the procedures run to implement the changes in the file management system. The employer is selected, and the employer name, number or plan number is entered, and the pay centre to be updated is also selected from a screenshot of the type shown in FIG. 18A. The indentifiers are then changed to the new combination of identifiers to be used. The conversion data set which was noted when the file was in FTP format is entered. On hitting "go" the following takes place. The match key rule is rewritten to the new rule, and new match keys are created for each account from the data in the new file as per the match key conversion screen of FIG. 18B. The account is located using the old match key, and the old match key is replaced with the new match key for future matching purposes.

The transaction instructions of the transaction file are not limited to financial payments to be made into investor accounts but will extend to all types of valuable commodities and all types of transactions including, but not limited to, superannuation contributions, insurance payments, insurance rebates, allocation of loyalty reward points etc. Similarly, contribution data is not to be limited to superannuation contributions but to all contributions, including positive and negative amounts of valuable commodities that may be allocated to an account. It will be appreciated by the skilled reader that the term "account" as used herein is not used to denote financial accounts exclusively but refers to a record held in a system database and may be used for storing and tracking data relating to a particular entity. With appropriate authorisation from account holders, the system of the preferred embodiment described can be used to simultaneously instruct multiple deductions from accounts.

The present invention is particularly suitable in an environment where instructions are of a repetitive nature, such as the payroll embodiments described above, and where there is substantial identity between successive data sets which are being matched over a period of time, with the result that in the majority of cases automatic matching occurs, and match keys are created for a series of repeat transactions rather than groups of successive once-off transactions where the data sets to be matched vary significantly with respect to the preceding data sets. A further example is in online and regular ordering of a similar range of stock items by a customer from a supplier. Periodically, eg monthly, the retailer will order a supply of products from the supplier with only slight variations in the products and quantities ordered.

To streamline the stock ordering process, the customer may create a standard template including customer identification and a list identifying the items to be ordered. Each time an order file is to be generated, the customer can access the template and provide the quantity of the items required. The order file is then uploaded to the supplier system through a customer interface of the supplier system.

The supplier system comprises a database of uniquely identified items and current stock levels of those items and any extraneous information such as supply timeframes, price etc. The system will further comprise a match key data set that can be used to look up the database to identify products requested in a received order.

A received order file is converted if necessary into the supplier's internal file standard and the individual order instructions written into an instruction log. Match keys are derived for each order instruction in the file using an appropriate match key derivation rule set stored in the system, which match keys will also be written into the instruction log. The individual instructions of the order file are then automatically reconciled with the supplier database using the derived match keys. Item identifiers, eg part numbers, associated with the match keys in the supplier database are written into the instruction log. A report detailing at least any unreconciled order instructions is generated and provided to the customer through the customer interface.

For the unreconciled orders, the customer is given the option of manually searching the supplier database to find a matching item, or specifying an order to be ignored from the order file. Once all orders are matched or ignored, the customer can confirm the order file.

The order system also allows for payment of orders similar to the investor contribution embodiment described above. The total cost of the matched orders in the order file is calculated and the customer selects one of any number of known ways for paying for the order, eg direct credit, direct debit etc. The supplier can then fulfil the matched order instructions in accordance with their usual practice.

It should be noted that, in this example, matches created by the customer will not allow for the over-writing of the match key in the match key data set of the supplier. This is because the step of manual matching is customer driven yet, unlike the superannuation account example described above, the product is not inextricably linked with the customer. That is, what one customer determines to be a match will not necessarily be consistent for all customers.

For example, one cause of an unreconcilable order is where a product is superseded. When the supplier starts supplying a new product, a new match key will be created for that product. In addition, the supplier may wish to direct customers seeking the old product to the new product. One solution is to allow multiple match keys for a product such that a many-to-one mapping relationship exists. Thus when a customer orders a superseded product, the old match key of the order instruction is automatically matched with the substitute product. This prevents the customer from having to ensure that their order template is exactly aligned with the supplier's product list.

There may be circumstances where a customer chooses to select an alternative substitute product, in which circumstances it is preferable if a customer specific match key can be associated with that product to enable automatic matching in future orders from that customer. To allow for this, the supplier systems may store a comprehensive match key database with match key rules specific to each customer and a set of default match key rules.

The match key rules will map one or more fields of an order instruction to a match key. For example, the match key rule may simply match a Product D to a match key, eg.:

Product→MatchKey#A
ProductB→MatchKey#B

Similarly, a customer match key rule set contains rules mapping order instruction fields to match keys, eg ProductX→MatchKey#aa
ProductY→MatchKey#bb The customer match key rule set is stored in the match key data set addressed using Customer ID.

When an order file is received, the match key fields of the instruction log are populated by first searching the match key rule set allocated to the customer. For each order instruction, if a rule exists in the customer's match key database then the match key written into the instruction log is the match key retrieved according to the rule. Otherwise, the default match key for the product is retrieved.

The use of default match keys allows the size of the database required to store the match keys to be minimal.

When a customer makes and confirms a manual match between an order instruction and a product in the supplier database, a new match key rule is written into the customer's match key data set.

An example of an environment where this embodiment may be suitable is in ordering spare parts for motor vehicles etc. Analogous environments include inter alia instructions from investors to stock brokers, which instructions identify securities etc to be traded. Table A below identifies some further applications of the present invention:

TABLE A

| Application | Explanation of use |
| --- | --- |
| Tax payments on behalf of: Employees (income tax) investors (withholding tax) | Uploading file of tax payers' details and total value of payments. Real time error correction of payments |
| Medical insurance payments for staff | Uploading file of individual insurance premium payments and total value of payments. Real time error correction of premiums/payments. |
| Insurance payments for staff | Uploading file of individual insurance premium payments and total value of payments. Real time error correction of premiums/payments. |
| Licence fees: software licences royalty payments | Uploading file of payments for individual licence payments and total value of payments. Real time error correction of payments. |
| Bulk processing of orders for: stock stationery spare parts building supplies | Uploading file of payments and total value of payments. Real time error correction of payments to parties not recognised. |
| Online grocery shopping | Uploading file of groceries required and total value of purchase. Real time error correction of items available. |
| Transaction processing | Any form of transaction processing where data sets to be matched retain core identity. |

The invention as described herein in the preferred embodiments provides a significant advantage in that it allows a user to interact directly with the core administration system in real time so that any conflict can also be resolved in real time without confusion as to what party bears responsibility for resolving those conflicts.

A preferred architecture and file management structure, in particular for the File management gateway (FMG) and the Data and Contributions Module (DCM) gateway will now be described.

The FMG is responsible for receiving Superannuation Member Registrations, Maintenance and Contribution requests, then orchestrating the flow of the messages through to FMS and returning the acknowledgments back to the sender. The FMG is configured to receive files coming in generic Super Message format produced as an output of a contributing entity's payroll system. In particular, the FMG is configured to handle messages in SuperEC format which is a common message protocol being developed and implemented across the superannuation industry in Australia. Internally the system uses an internal standard based on the SuperEC standard.

SuperEC

SuperEC has defined three generic message formats:
1. Registration and Contributions
2. Rollovers
3. Acknowledgments Each message format is subdivided into two or three message formats depending on the scenario of the transaction, the message formats for Registration and Contributions, and Acknowledgments are as follows:
1. Registration and Contributions
   a. SUPEMP (Employer Registration and Maintenance)
   b. SUPMEM (Member Registration and Maintenance)
   c. SUPCONT (Member Contributions)
2. Acknowledgments
   a. ACK (Positive Ack)
   b. NACK (Negative Ack)

The DCM gateway uses the message format specified by SuperEC standard as a base for the internal message format. SuperEC defines also the flow of messages for Superannuation transactions.

The FlatFile message format that FMS uses will support all the Super EC fields. If a full-set SuperEC message arrives from an employer, the FMG will not filter the unused fields before converting the file into FlatFile and passing it to FMS. FMS will only pick up the fields that it uses and ignores the blank or unused fields.

The FlatFile that FMS will accept comprises TAB and CR delimited files with Tag identifiers. The records are delimited by CR and fields are delimited by TABs. Record lines are prefixed by tags which identify the type of this record. This allows greater flexibility in the FlatFile structure.

The mapping from the received file format to the FMS FlatFile format uses the Microsoft Biztalk™ application. In Biztalk™ schemas for delimited FlatFiles only one delimiter type can be specified for a record that applies to all nodes under that record, including fields and subrecords. To allow records to be delimited by carriage returns and record fields to be delimited by TAB a schema for the FMS FlatFile was created with the same hierarchical structure as SuperEC, except that records that contain subrecords do not contain fields at the same level as the subrecords. This is achieved by creating a container subrecord that consists of the fields that ought to belong to the main record.

Figure 19:
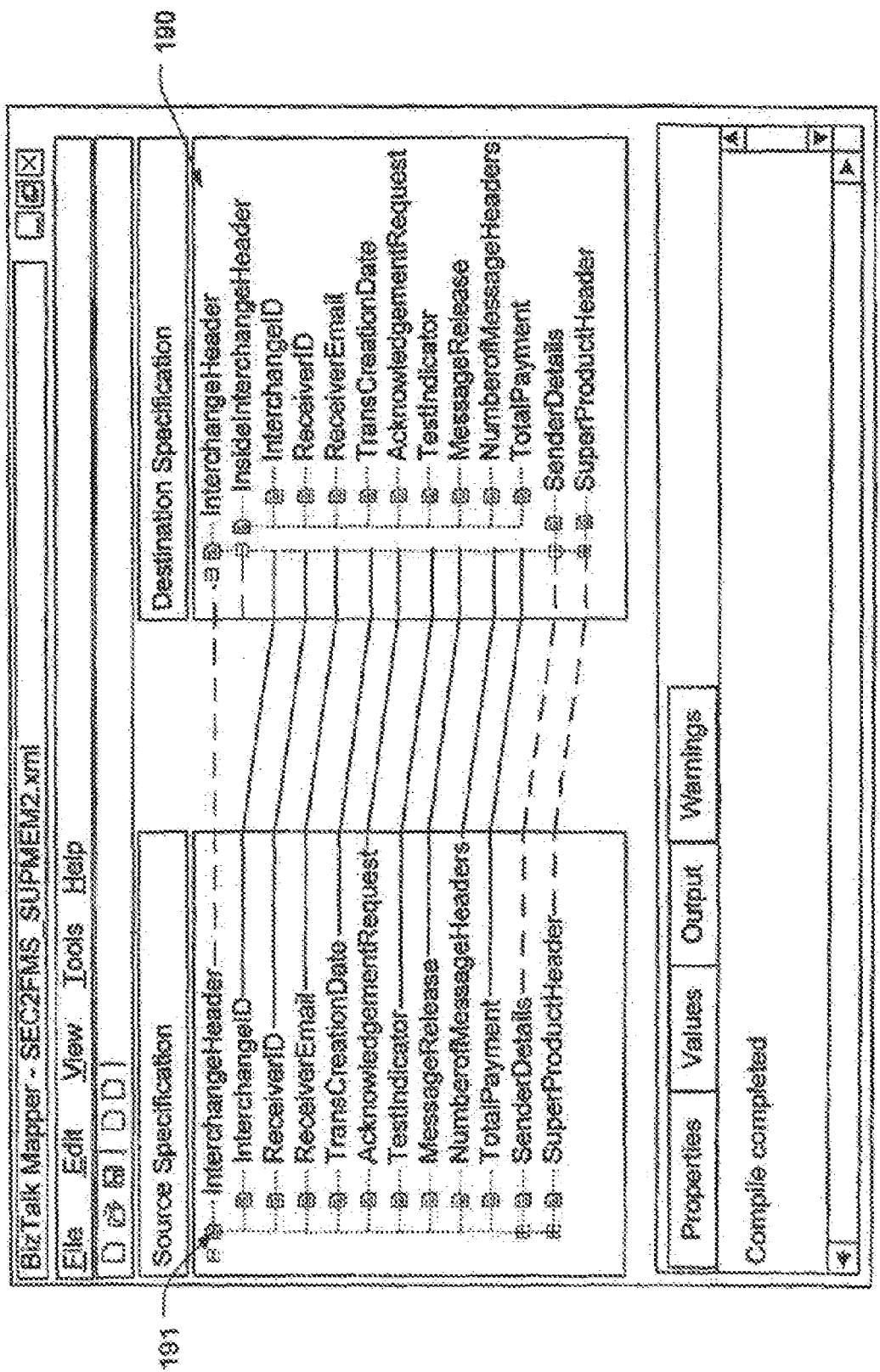
FIG. 19 shows a sample screen shot of a sub record structure used in the file conversion process.

The screenshot provided in FIG. 19 shows how instead of having fields inside InterchangeHeader record, a subrecord InsideInterchangeHeader 190 is created that contains all the fields that were under the InterchangeHeader 191. This ensures that InterchangeHeader only has record nodes, delimited by carriage returns.

Figure 20:
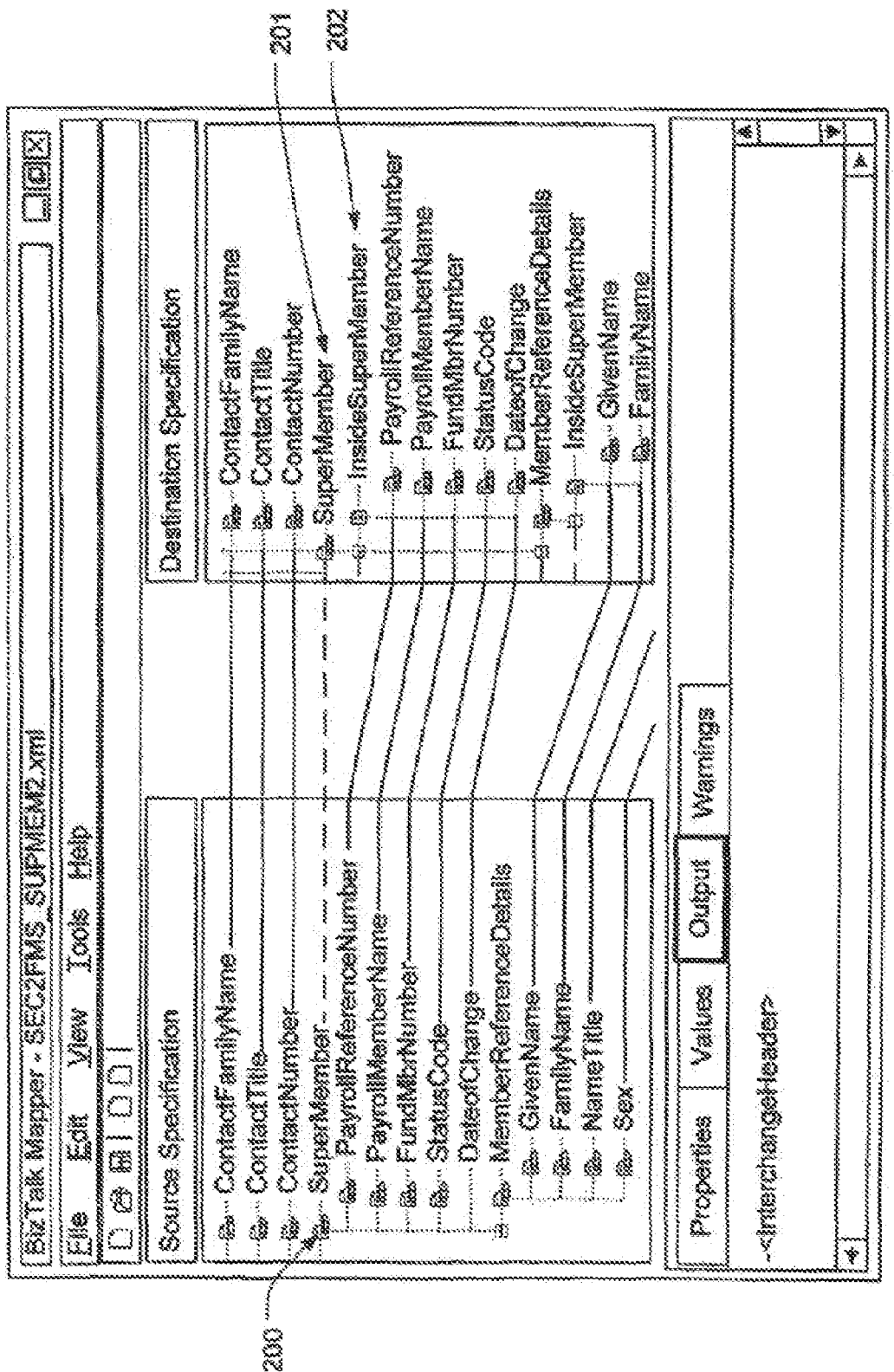
FIG. 20 shows a sample screen shot linking a source record to a destination record in the file conversion process.

To do this successfully in Biztalk™ Mapper links are established between the parent records, not just the fields within records. The screenshot of FIG. 20 shows how a Source SuperMember record 200 is linked to a Destination SuperMember record 201. Without this, the mapper will default to linking Source SuperMember record to Destination InsideSuperMember record 202, which will destroy the hierarchical structure of the source document.

The message flow architecture of the DCM (Data Control Module) gateway will now be described in more detail.

The DCM gateway's main functions are:

Receive Corporate Super Messages for Member Registration, Maintenance and Contribution, in Generic Super Message Format—which is specific to each payroll system. This includes SuperEC compliant messages.

Validate Message Syntax

Transform/Map Messages into Internal SuperEC XML Format.

Perform preparatory function validations

Transform/Map Messages into FMS FlatFile Format.

Receive Acknowledgment messages from FMS.

Transform/Map Message into Generic Acknowledgment Format. This includes SuperEC compliant messages.

Figure 21:
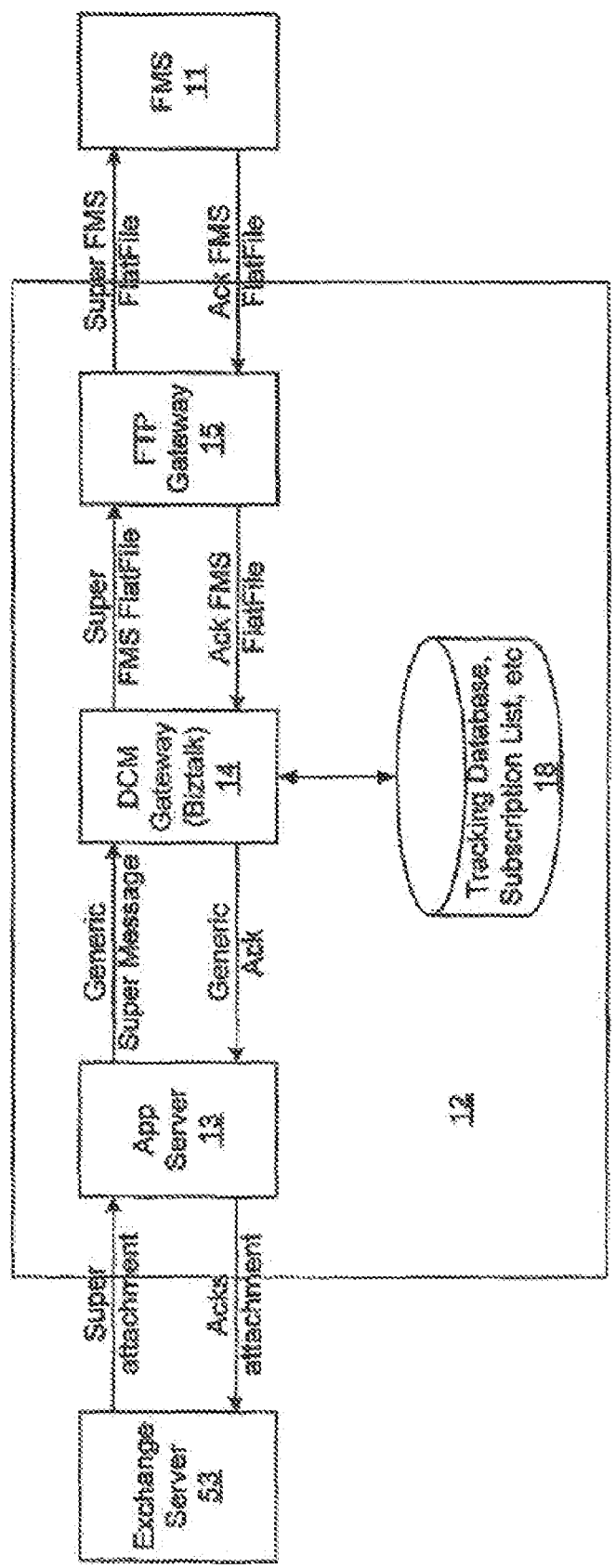
FIG. 21 shows a high-level overview of the DCM gateway connectivity.

Referring to FIG. 21, the process of receiving and sending messages from the outside world are handled by an Exchange Server 53. Flatfiles coming from and going to the FMS 11 are done via FTP, through the FTP gateway 15.

The FMS 11 returns SuperEC ACK messages to the data transformation engine, which is in the form of a DCM 14. If the employer/paycentre owning the Interchange is SuperEC compliant then the DCM will simply send the XML SuperEC ACK message back to them. Otherwise, the DCM will convert the acknowledgment FlatFile into the format required by the contributing entity. In addition to that, the DCM 14 will store a copy of the ACK message in CSV and XML files in the host server. The tracking database will be updated with enough information so that a FrontEnd application can use it to find the relevant ACK files for a particular Interchange.

A FrontEnd page will be available to the delegates of the employer/paycentre so that they can check on the status of their Interchange. They will be given an option to download the CSV/XML files from the host server if they wish to do so.

Note that this process applies to all Superannuation transactions, regardless of whether the employer/paycentre is SuperEC compliant or prefers to receive ACK messages in their own proprietary format.

FIG. 22 to 25 shows all of those processes that occur within the DCM gateway 14 and these processes will now be described in greater detail with references to these Figures. However it should be noted that the design outlined below caters for external message formats arriving in CSV or XML format, though compatibility with other message formats is encompassed.

Step 1—Message Reception Stage

Figure 22:
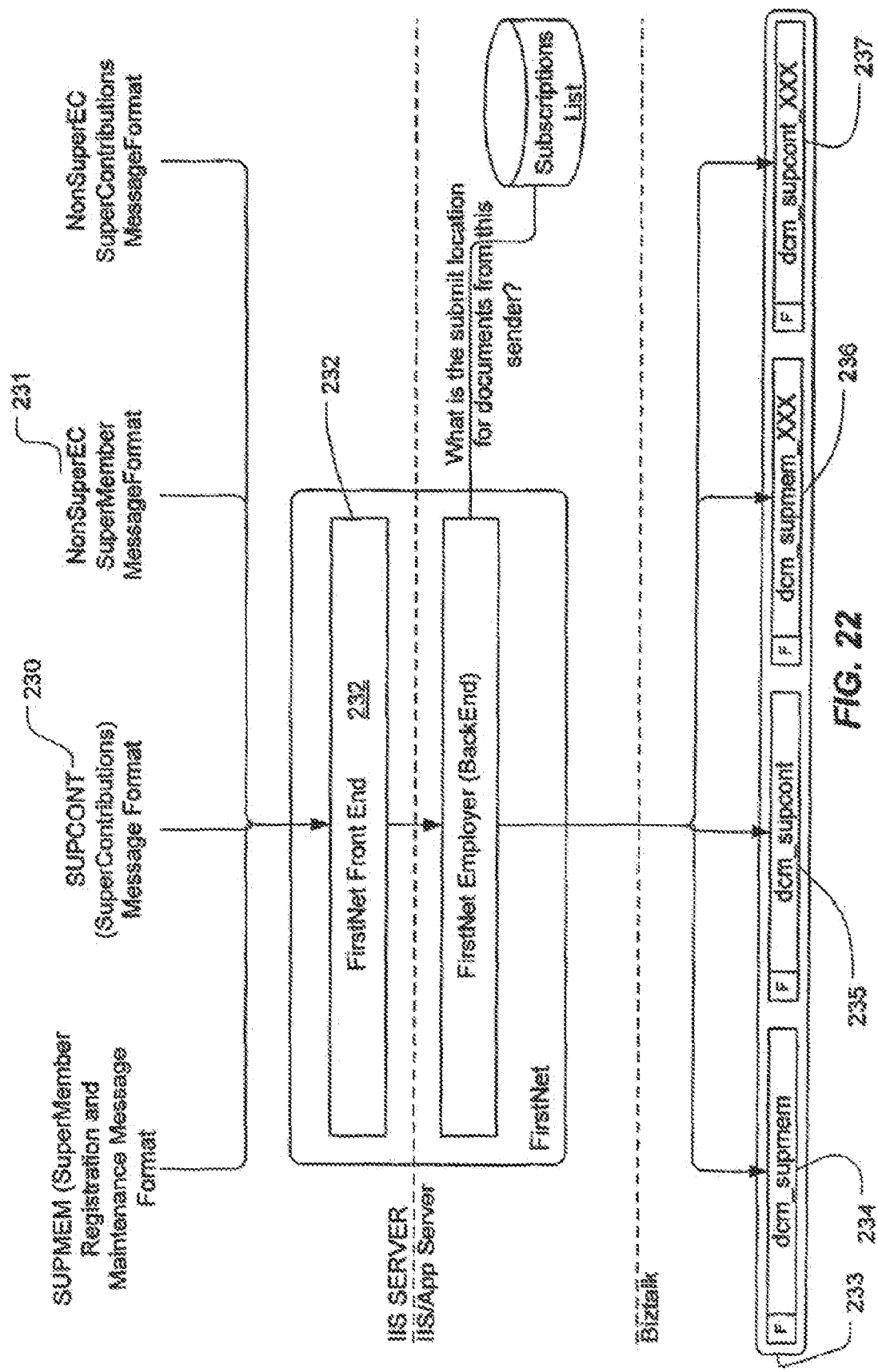
FIG. 22 shows a sample file structure and architecture through a first message reception stage.

The process of message reception is shown in FIG. 22. Although the preference is to receive SuperEC XML compliant messages 230 the system caters for messages coming in non-SuperEC CSV format 231. The PayCentre (contributing) entities upload the contribution files through the FrontEnd 232, files are processed and eventually placed into dedicated folders on the Biztalk™ receiving server 233. To make implementation more efficient, multiple inbox folders 234-7 are used. Each folder is dedicated to receive one type of message format from one PayCentre only. The FrontEnd will query the subscription list database to find the submit location of files for a particular PayCentre.

Step 2—Mapping into Internal SuperEC Format

Figure 23:
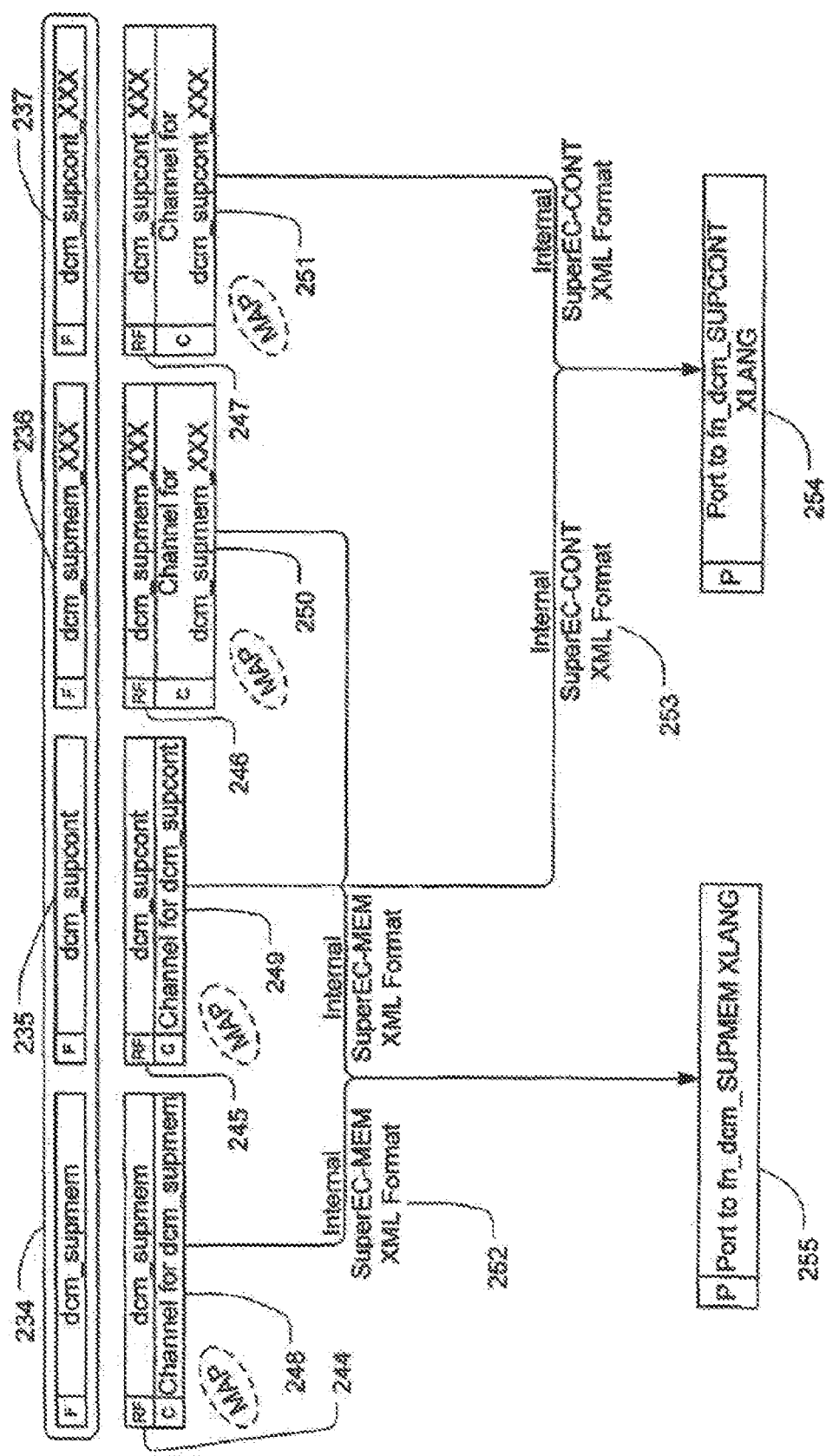
FIG. 23 shows a sample file structure and architecture through a second phase of mapping into Internal SuperEC.
Figure 24:
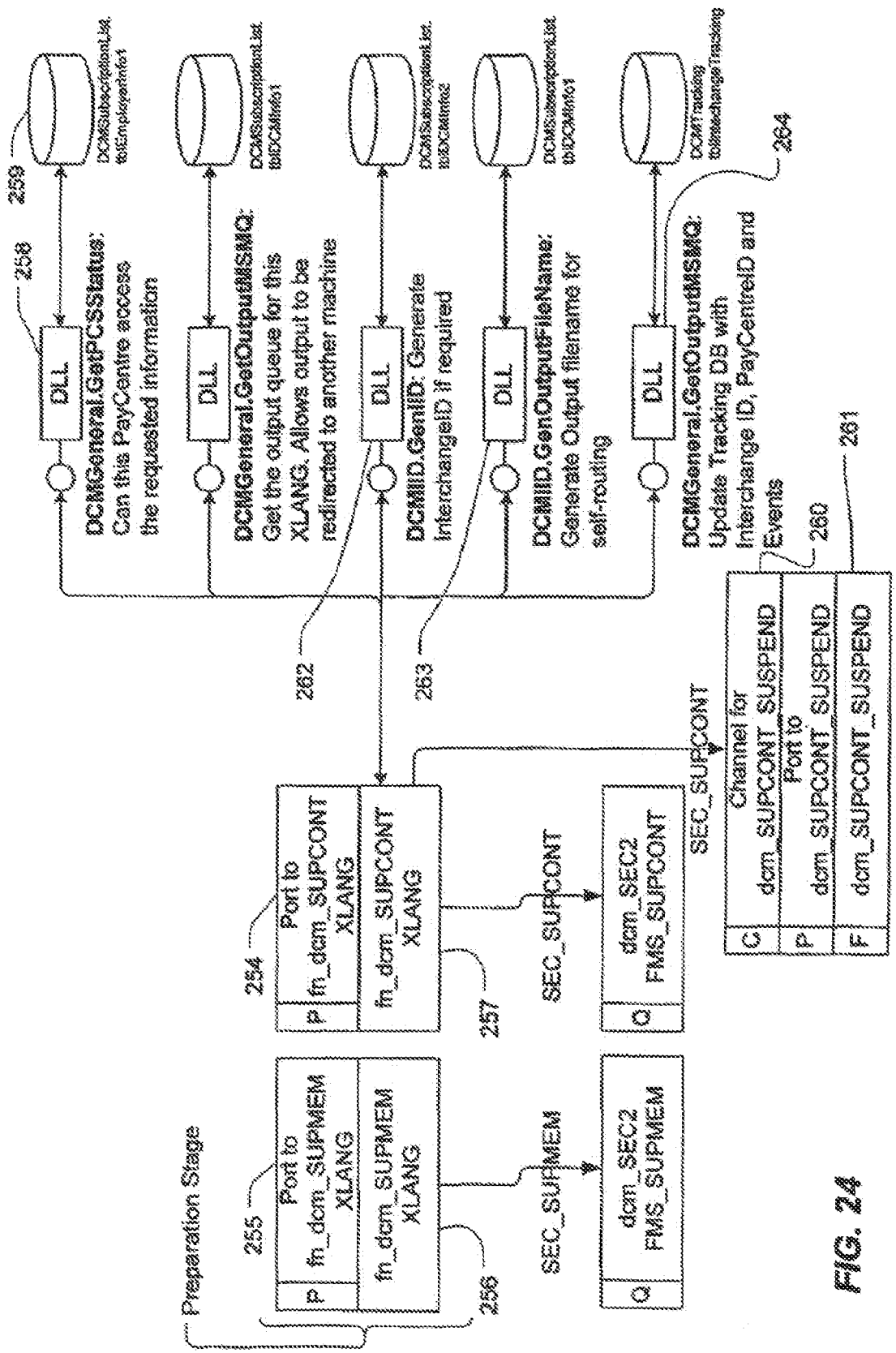
FIG. 24 shows a sample file structure and architecture through a third preparation stage.

Referring now to FIG. 23, once the files arrive in their respective folders, Biztalk™ Messaging Service will pick up those files through corresponding File Receive Functions 244 to 247 (RF denotes Receive Functions). There will be one File Receive Function per folder. Each Receive Function is bound to one Channel (denoted by C) 248 to 251, ie there this is a one-to-one relationship. Each Channel is dedicated to receive only one type of message format, and is configured to map the incoming message into a common Internal SuperEC message format. There are two types of these messages: Internal SuperEC-MEM 252 for SuperEC Member and Internal SuperEC-CONT 253 for contributions. These internal message formats may differ from the SuperEC formats only that they are padded with extra XML records. Each mapping definition is unique for each PayCentre. During the mapping process the PayCentreID for this file is inserted into the destination file. This PayCentreID is determined by the system when the employer/Pay Centre first registers with the system.

Channels that process Super Contribution files 235 and 237 are bound to the Port to fn_dcm_SUPCONT XLANG 254, which will initiate the XLANG that processes Super Contribution messages. Similarly Channels that process Super Member files 234 and 236 are bound to the Port to fn_dcm_SUPMEM XLANG 255, which will instantiate the XLANG that processes Super Member messages.

Step 3—Preparation Stage

Figure 25:
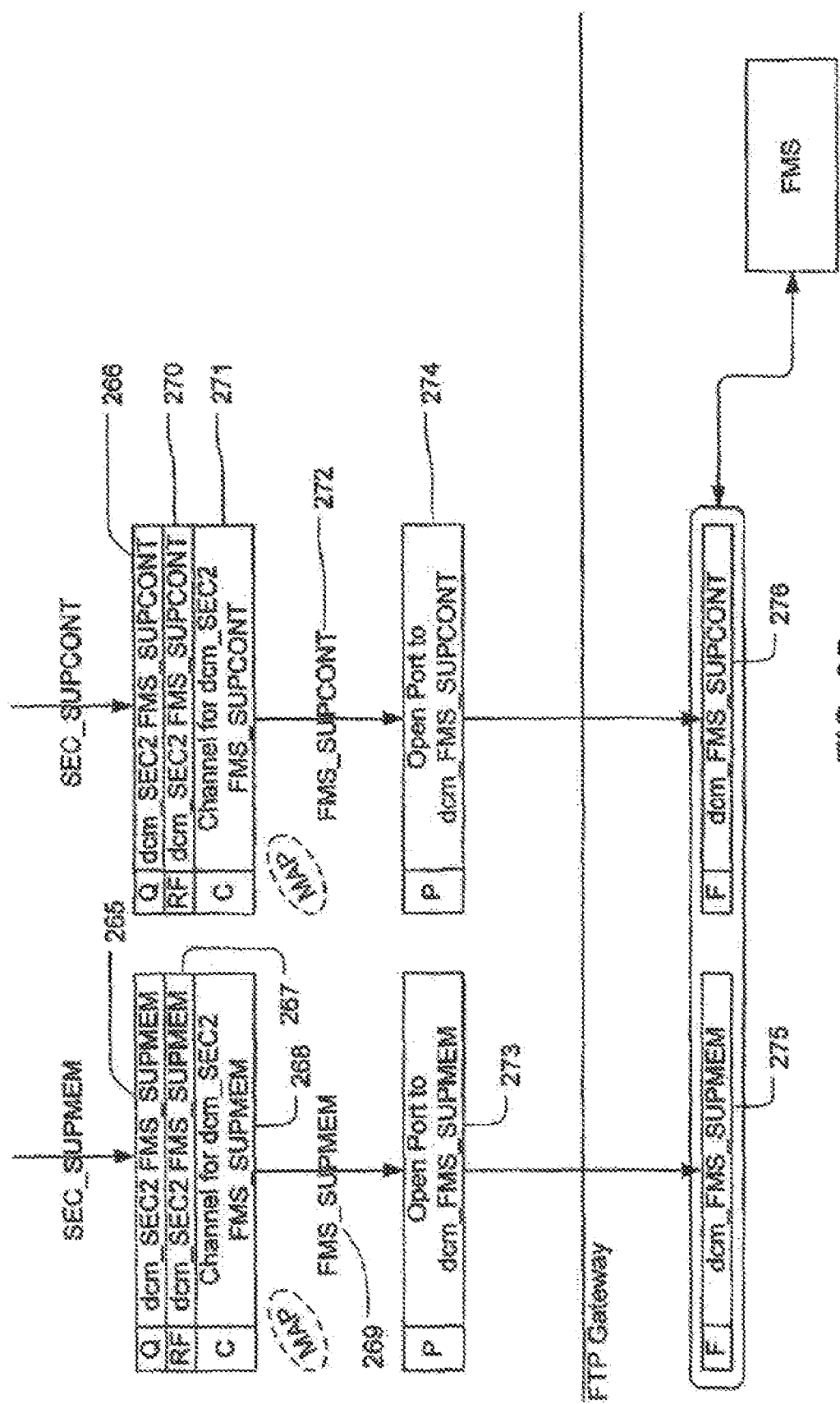
FIG. 25 shows a sample file structure and architecture through fourth output and FMS response stage.

The preparation stage is described with reference to FIG. 25. The functional XLANGs (fn_dcm_SUPCONT/MEM XLANG) 256 and 257 will instantiate upon receipt of the messages from the Ports discussed earlier. These XLANGs will be responsible for checking if this message is allowed for the PayCentre entity that uploaded this file. It does that by using the DCMGeneral.GetPCStatus COM object 258 to query the Subscription List database 259. If the transaction is not allowed, then the message is immediately passed to dcm_SUPCONT_SUSPEND channel 260 which merely dumps the message as a file into a dcm_SUPCONT_SUSPEND folder 261. These files can then be resubmitted if needed by copying them into the standard message format inbox.

The XLANGs will also generate an IID for the document if needed (using DCMIID.GenIID object) 262. The filename for the final output from Biztalk™ to FTP Gateway is generated afterwards, as is shown at 263. This consists of PayCentreID and File Sequence number, as well as the UNC of the destination file server. Changing this UNC is a matter of changing an entry in the DCMSubscriptionList.tblDCMInfo1 SQL table. The filename is then injected into the file itself as a field.

The Tracking.PutDCMEvents object 264 is used to put DCM Events into the Tracking Database. Tracking is defined for reception of message, suspension and successful sending of message to the next step. The XLANG is configured to send successful messages out into a static MSMQ. However the name of that queue is determined dynamically through the DCMGeneral.GetOutputQueue object, which will query the Subscription List database for it The reason behind this is to allow reconfiguring the setup to run the preparation and output stages on two separate machines without having to change the XLANGs.

Step 4—Output and FMS Response Stage

Figure 26:
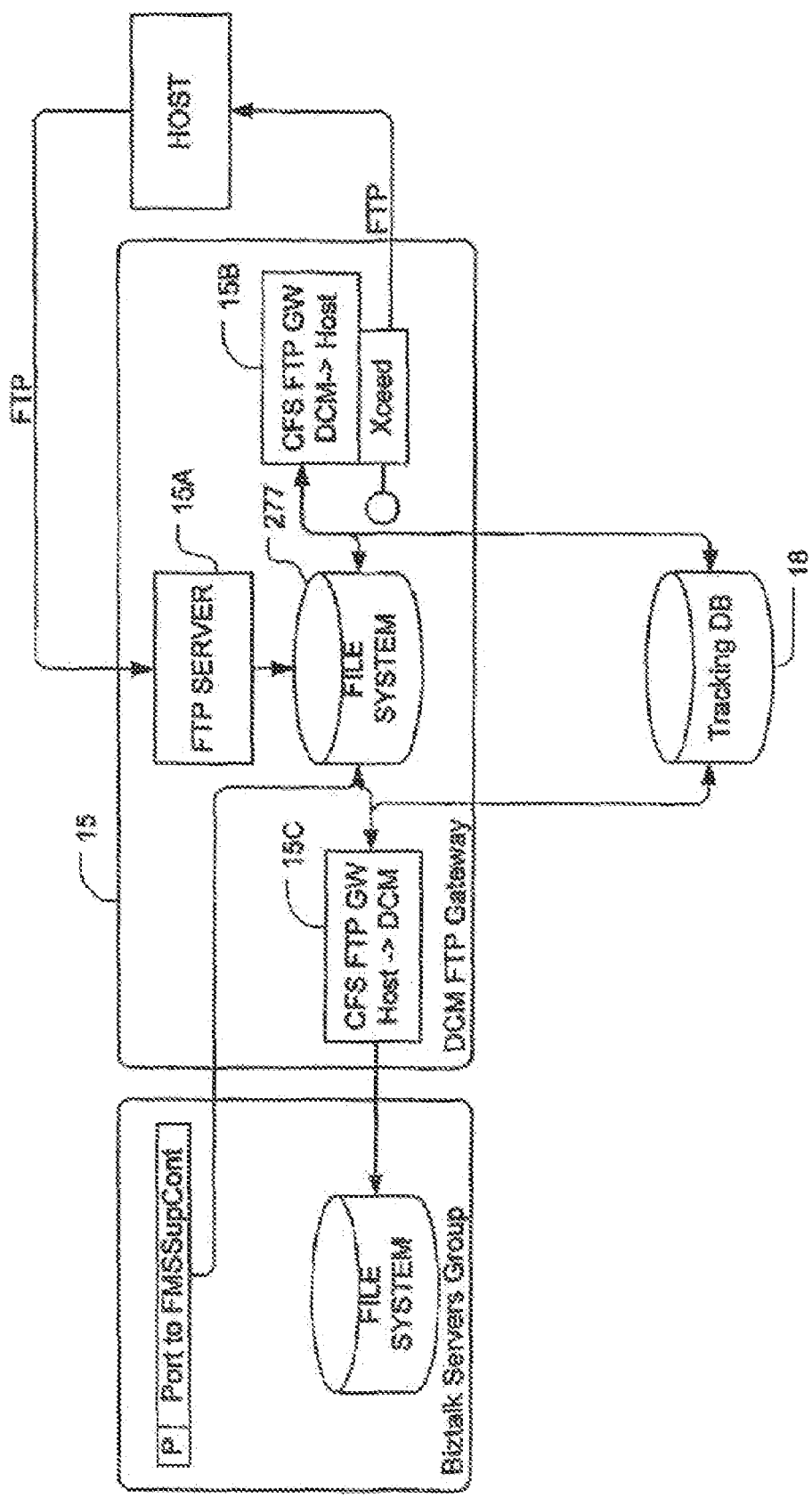
FIG. 26 shows a sample architecture for the FTP gateway.

The output and response stage will now be described with reference to FIG. 26. The functional XLANGs, fn_dcm_SUPMEM and fn_dcm_SUPCONT XLANGs will eventually submit the messages into the dcm_SEC2FMS_SUPMEM and dcm_SEC2FMS_SUPCONT MSMQ queues 265 and 266, respectively. The dcm_SEC2FMS_SUPMEM queue is bound to a MSMQ ReceiveFunction 267, which will submit the messages into the dcm_SEC2FMS_SUPMEM Channel 268. This Channel will map the Internal SuperEC Message Format into an FMS SuperMember Flat File format 269.

The dcm_SEC2FMS_SUPCONT queue 266 is bound to a MSMQ ReceiveFunction 270, which will submit the messages into the dcm_SEC2FMS_SUPCONT Channel 271. This Channel will map the Internal SuperEC Message Format into an FMS SuperContributions Flat File format 272. The resulting FMS Flat Files are passed to Ports 273 and 274 which will output the files through the network into local directories 275 and 276 on the FTP Gateway server. There are two directories, one 275 for Member and another 276 for Contribution. These ports are of the type OPEN Destination, which pick up the transport information from a field within the document itself.

These files are then picked up by means of an FTP engine, which will transfer the files to FMS through FTP.

DCM Components

Logically the DCM architecture can be broken down into several components:
1. Non Biztalk™ Databases. Based on MS SQL Server, this is used by DCM to accommodate extra functions not provided by Biztalk™.
2. DLLs. Used to extend Biztalk™'s functionality.
3. Orchestrator. Based on MS Biztalk™ server, used to orchestrate the flow messages.
4. FTP Gateway. Used to transfer files between DCM and FMS.

These components will be described individually below.

Database Design

The DCM gateway utilises two databases mainly for the purpose of tracking, logging and storing system data such as message path rules etc. These are:
1. Subscription List
2. Tracking The separation into two databases are logical rather than physical, ie they would typically be implemented in many tables in a single database rather than two separate DBs, though multiple databases may be used.

(a) Subscription List

Tables in the Subscription List database contain information of Employers/PayCentres that are registered to do Super transactions with the system. The database stores mostly administrative details such as contact info, addresses, email, authorised delegate, etc.

Files coming from DCM 14 will have to arrive at FMS 11 via the FTP gateway 15. This process is the responsibility of the FTP gateway. As shown in FIG. 26, the FTP gateway itself is made of MS FTP server 15A and two applications, one 15B to manage transfer of files in the subscription list database from DCM to FMS and another 15C for the reverse direction. The applications would consist of an FIT client component which would be used to communicate with the internal FTP server and FMS's. In a preferred embodiment, the FTP client component 15B used is one made by Xceed Software.

Figure 27:
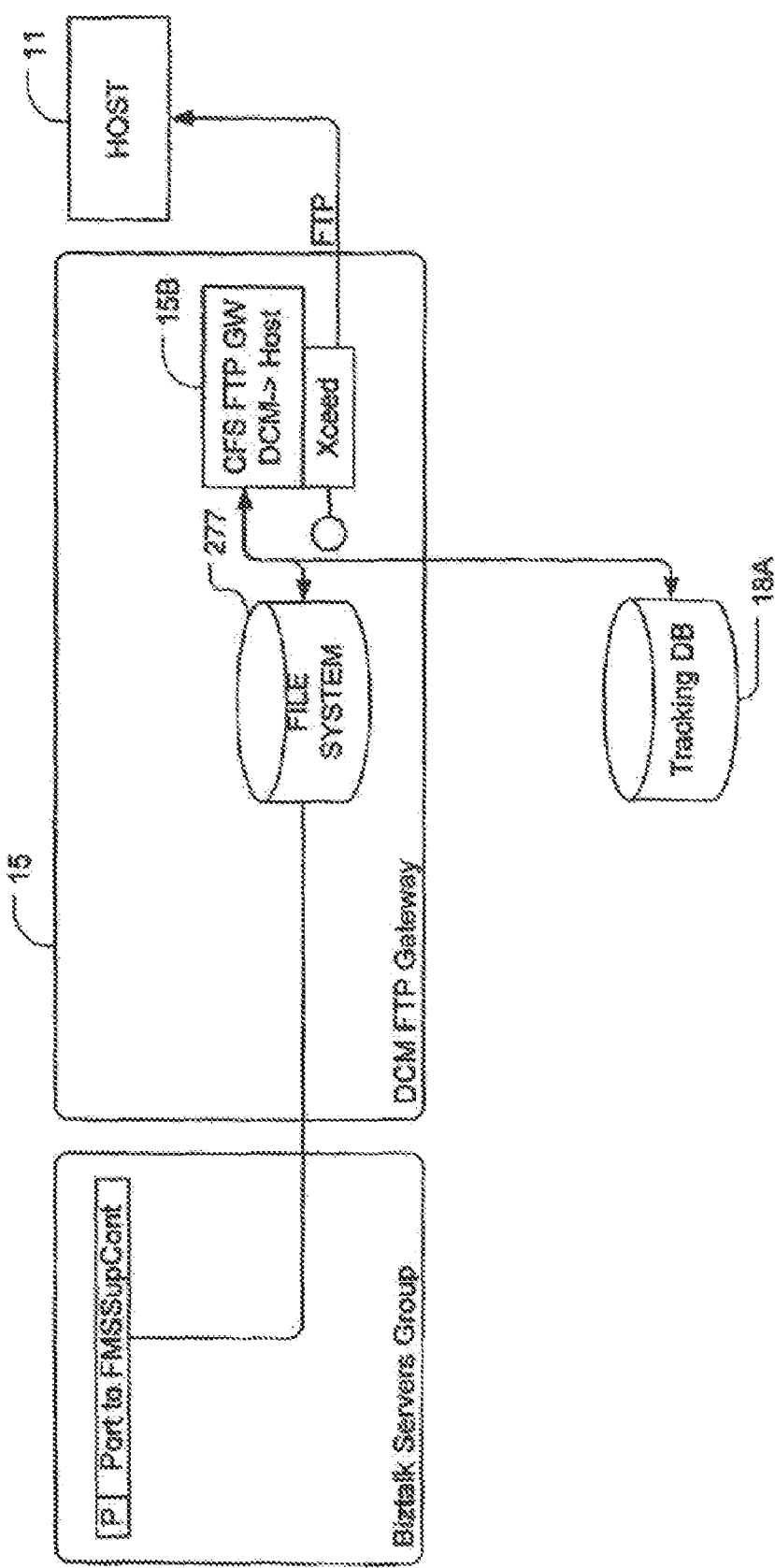
FIG. 27 shows the message flows for DCM to the host.

FTP GW DCM→HOST: The process of transferring files from DCM to FMS(HOST) is outlined in FIG. 27 and involves the steps of:
1. Poll FlatFiles from one local directory:
   a. Directory List—FIFO (time sort), pick FileNames of two of the oldest files.
   b. Check Tracking DB 18A for FileName, if exists then this file is currently being processed by another instance of this application, so choose the second name, and repeat checking process.
   c. Add FileName to the Tracking DB.
   d. Derive new name→add to Tracking DB.
2. Instantiate FTP session to Host 11.
3. Send initialisation commands
4. Send data file to FMS with the proper FMS dataset name (ie. Put datafilename fmsdatasetname)
5. When the datafile has been completely transferred, send dummy check file to FMS with the proper FMS check file dataset name (ie. Put dummycheckfilename fmscheckfiledatasetname).
6. Move data file on the FTP Gateway to archive directory. This must be a move (not copy) operation and must be performed on the same physical partition as the source directory. This will ensure maximum efficiency as only the file link needs to be modified, moving the file to another physical partition will involve copying the data and deleting the original file.
7. Update Tracking DB 18A to indicate that the file has been successfully transferred.

Figure 28:
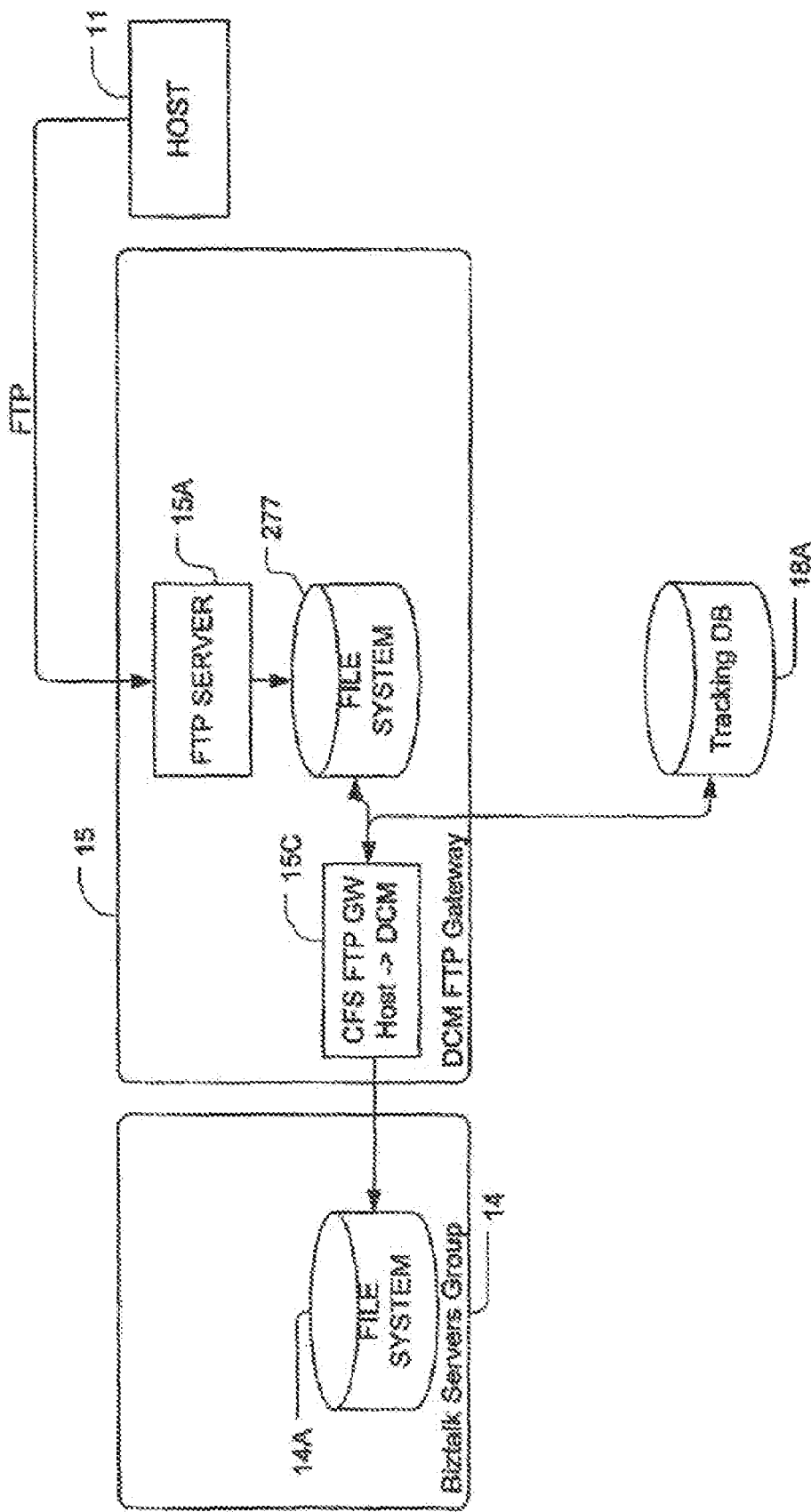
FIG. 28 shows the message flows from the host to the DCM.

FMS will poll for Check Files rather than Data Files. Since a Check File will only be sent when its Data file has been completely transferred, FMS will not attempt to process a half-transferred data file which may be caused by errors during transmission. The last half of a Check File's name contains the last half of its data file's name The process of transferring files from FMS(HOST) 11 to DCM 14 is outlined below with reference to FIG. 28:
1. FMS will transfer the SuperEC Acknowledgment data file to the FTP server 15A.
2. FMS will transfer a check file for each successfully transferred data file.
3. The HOST→DCM process 15C polls for check files from FMS.
   a. Directory List—FIFO (time sort), pick file names of two of the oldest checkfiles.
   b. Check Tracking DB 18A for check file name, if exists then this file is currently being processed by another instance of this application, so choose the second name, and repeat checking process.
   c. Add check file name to the Tracking DB.
   d. Derive data file name from check file name
4. Find data file and transfer it to the Biztalk™ file system 14A through a mapped network drive.
5. Once transfer is finished, move the data and check file on the FTP gateway 15 to an archive directory. This must be a move (not copy) operation and must be performed on the same physical partition as the source directory. This will ensure maximum efficiency as only the file link needs to be modified, moving the file to another physical partition will involve copying the data and deleting the original file.
6. Update Tracking DB 18A to indicate that the file has been successfully transferred.

Designing for Scalability

There are several approaches that can be considered to improve scalability of the DCM gateway:
1. Separate and Clustered SQL Server. This achieves optimisation as well as higher-availability at the same time. By separating the Biztalk™ Persistence Database into another server, the main Biztalk™ server load will settle into a pattern of memory and CPU intensive processing. This allows the system to use relatively cheaper machines for the Biztalk™ server and concentrate resources on building a SQL cluster with high-speed disk arrays. Clustering the SQL server ensures redundancy. The DCM specific databases such as Tracking and Subscription List should also be located on separate server from the main Biztalk™ server.

2. Load Balance Biztalk™ Servers. Biztalk™ servers can be load balanced with either WLBS or a Hardware Load Balancing. Unlike WLBS, the load balancing process in Hardware Load Balancing takes place outside of the servers in the load balanced group. This automatically removes the load balancing processing load on the servers, and as this process is now done in hardware, it will be more efficient. The product commonly used for this is the Cisco LocalDirector.
3. Specialise Biztalk™ Server Roles. Performance can be optimised further by specialising the roles of the Biztalk™ servers. In the most basic configuration, this means having one or a group of Biztalk™ servers dedicated for receiving and another group dedicated for processing and sending.
4. Use Local MSMQs to Handle Surges. Queues allow messages to accumulate during surges thus preventing loss of requests. This is beneficial as the applications do not have to process all the requests that arrive, only a portion at a time. Note that though this solution is not applicable when immediate response is expected (real-time), DCM is a loosely-coupled system for which queuing is suited.
5. Isolate ASP applications from Biztalk™ Receive Functions. Though Biztalk™ servers are also IIS servers, ASP apps should not be hosted on them. Biztalk™ servers should be limited to only running Biztalk™ Messaging and Orchestration Services.
6. COM+Load Balancing using App Centre. This is similar to load balancing MTS servers, AppCentre helps with the administration and management of the cluster as well as providing component load balancing based on performance.

Figure 29:
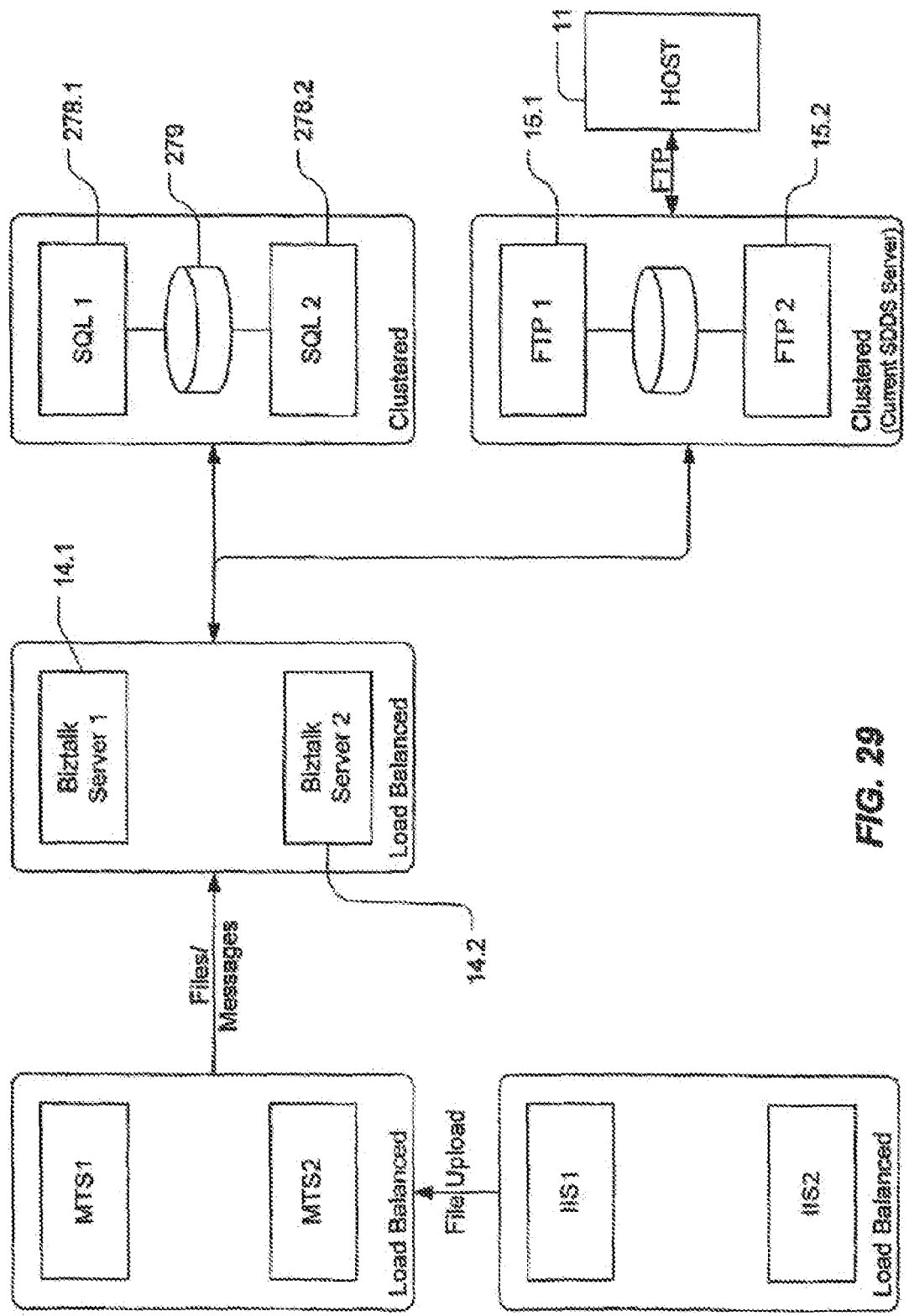
FIG. 29 shows a sample infrastructure arrangement.

FIG. 29 shows a preferred infrastructure for the DCM. The Biztalk™ servers 14.1 and 14.2 are in a load balanced configuration, while the SQL and FTP servers 278.1 and 278.2 and 15.1 and 15.2 are clustered. The SQL servers host the non-Biztalk™ databases (ie. Subscription List and Tracking and Logging) 279 as well as Biztalk™'s system databases. Therefore the Biztalk™ servers will be relieved of disk intensive processes. For the FTP servers an SDDS server can be used. Load balancing for Biztalk™ servers can be performed by MS WLBS or through Cisco Local Director.

The process within the FMS once a FlatFile has been transferred from the FMG via FTP will now be described. An FMS FlatFile is received from the FMG and is allocated a file reference number. The records of the FlatFile are extracted and individually entered into a transaction instruction log which is a table stored within a database of the FMS. One record from the file is entered per line of the log table. FIG. 30 shows an entry in the transaction log 311 in which the file reference 312 and data fields 313 (shown collectively) are populated. The transaction log also has a match key field 314, an FMS account number field 315 and a match status field 316. Initially, the match key, account and status fields are unpopulated as shown in FIG. 31.

A validation check is performed on the instruction data and if the instruction contains any unresolvable data errors, an error status is written into the status field for that instruction.

Figure 32:
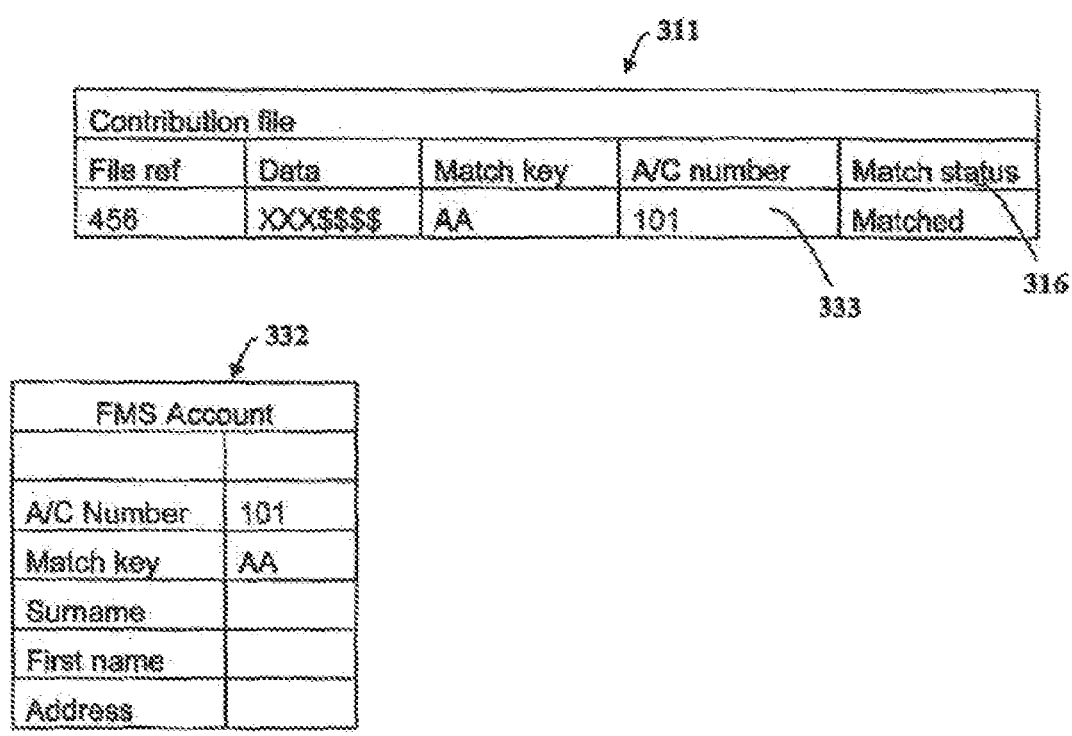
FIG. 32 shows the transaction log after the instruction has been matched to an FMS account.

The match key is then derived for each instruction using the match key rule-based processes described previously and the derived match key "AA" is written into the match key field 314 as shown in FIG. 31 corresponding match keys are derived for all of the other instructions in the file using the same match key rule. These match keys are then used to look up the FMS account systems. When an account 332 having an identical match key "AA" is located, the account number 333 of the FMS Account is written into the account field 315 in the transaction log 311 and a matched status is written into the respective status field 316, as can be seen in FIG. 32.

Once this process has been conducted for all instructions in the file, FMS generates an acknowledgment file from the transaction log and reports the status and account number of the matched records, the records that were unmatched, and the records that contained data errors in the manner described previously. The acknowledgment report is generated in an FMS FlatFile format and passed to the FMG where it is converted into a format for display on the user interface. The number of matched, unmatched and data error records displayed in the interface shown in FIG. 4 are calculated from the status fields of the transaction log for all log entries having the appropriate transaction file reference number. Similarly, the amount payable is calculated as the aggregate of the contribution fields of the transaction log for a particular transaction file reference number.

Similarly to the auto-reconciliation process, where a contributing entity manually selects an FMS account to match to a record in the transaction log, the account number is written into the respective account field of the logged record and a match status is written into the status field. At the same time, the match key of the FMS account, which was previous non-matching, is deleted and a new match key identical to the match key of the record is written into the match key field of the FMS account.

A contributing entity may elect to have an instruction ignored. When the contributing entity elects this option through the interface described previously, an ignore status is written into the transaction log for that record.

When a contributing entity selects to un-match a matched record, the account number and match status are deleted from the account and status fields respectively of the transaction log for that record.

Figure 33:
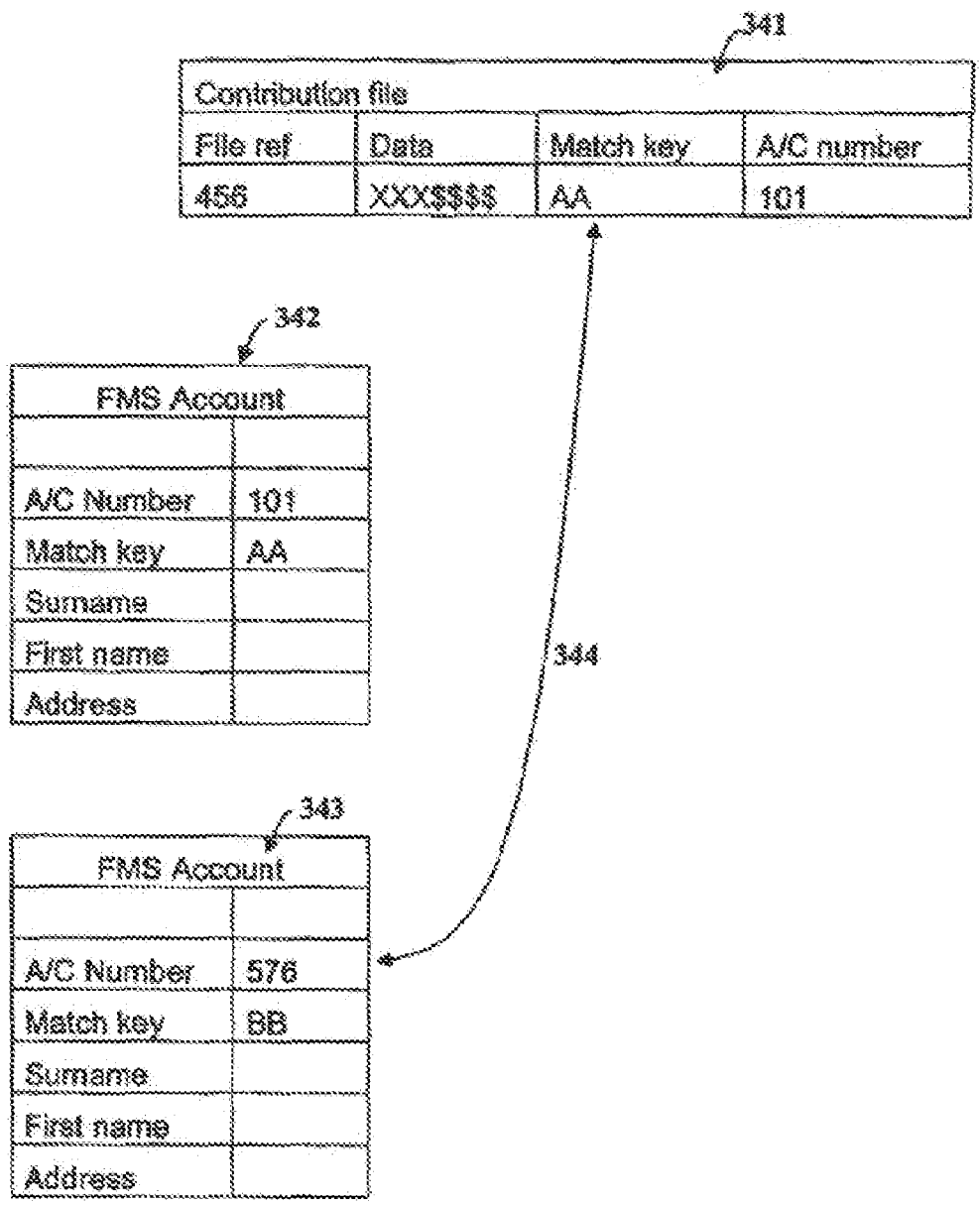
FIG. 33 shows the state of a record that has been incorrectly matched to an FMS account.
Figure 34:
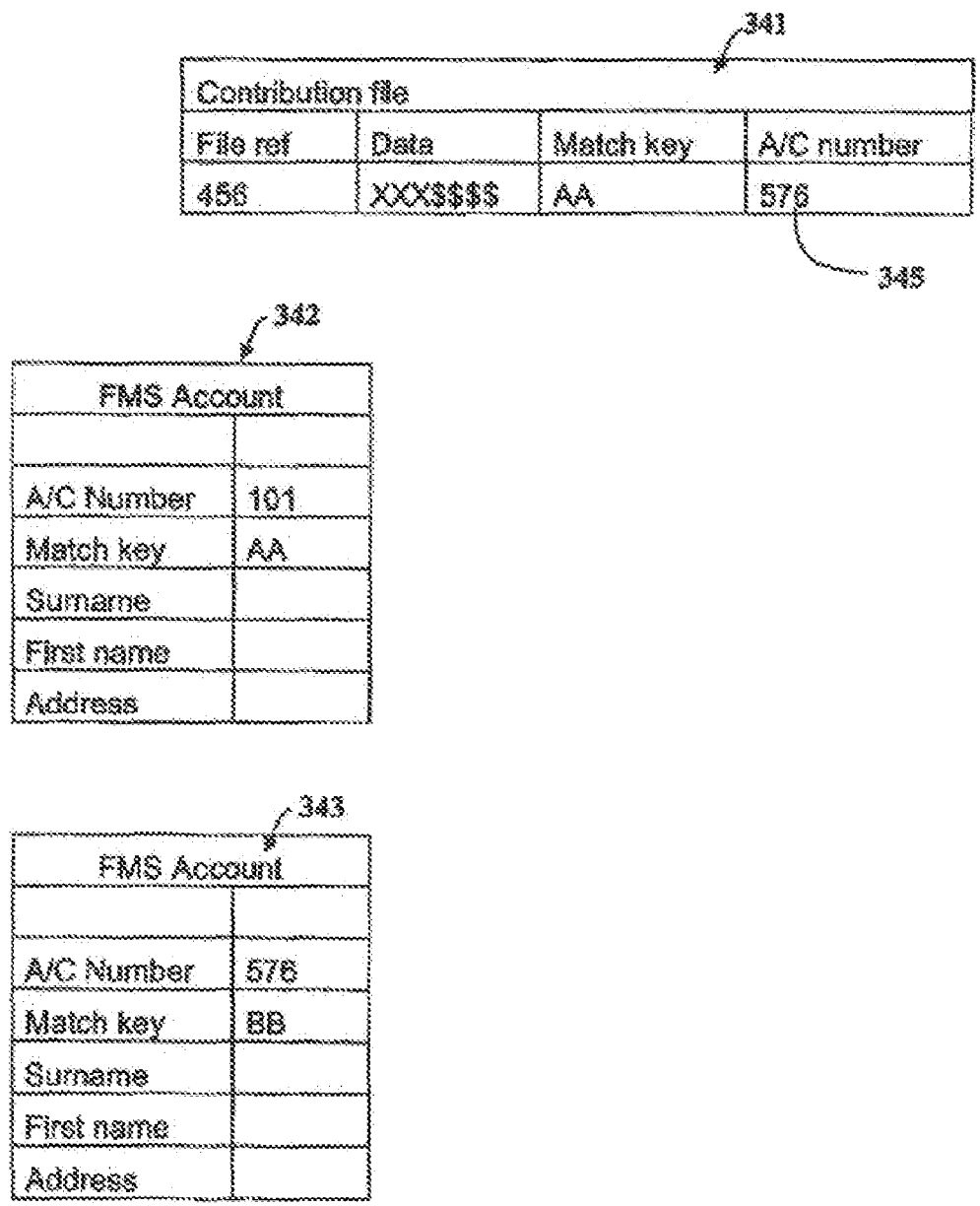
FIG. 34 shows the state of the record of FIG. 34 after the record has been matched to an alternative FMS record.

FIG. 33 illustrates the process where a contribution file record is incorrectly matched to an FMS account and is later correctly matched. Initially, a record 341 having a match key "AA" is matched to account 342 having account number "101" and match key "AA". A contributing entity may elect to manually match record 341 to a different account 343 having match key "BB" and account number "576" as is shown at 344, at which time, the account number "576" is written over account number "101" in the transaction log, as is shown at 345 in FIG. 34. At this stage, no data has been written into the FMS account system, as this step occurs when a transaction file is confirmed. In a further scenario, the contributing entity may elect to unmatch a record and have that record ignored from the transaction log. In this case, the match status is amended to an ignore status. The account number may additionally be deleted from the account field of the record though this is not essential.

Once all records registered in the transaction log are either matched or ignored, the contributing entity is able to confirm the transaction log. The step of confirming ensures that the contributing entity is aware of exactly which of the submitted instructions have been reconciled with the FMS account system and thus are capable of being carried out.

Figure 35:
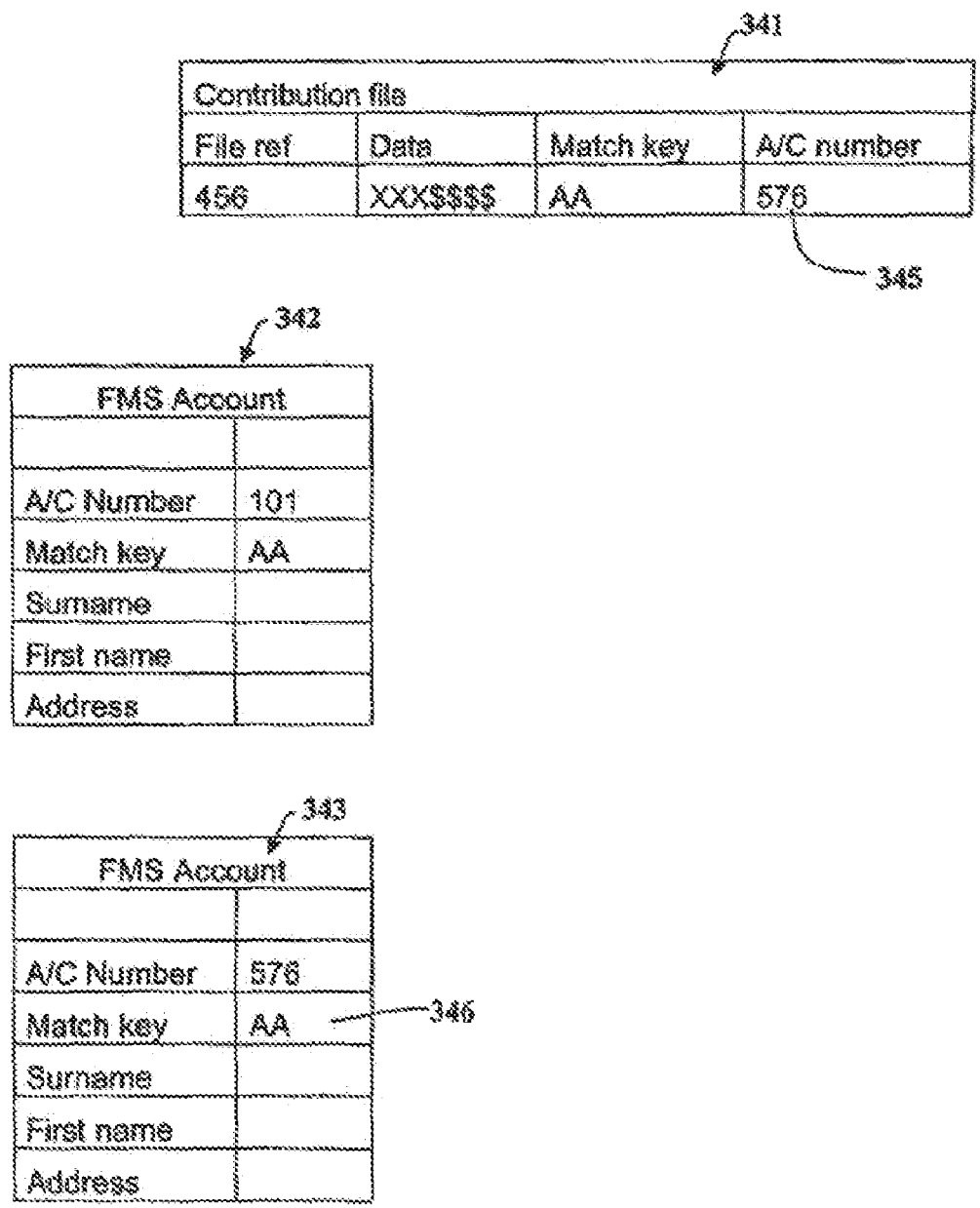
FIG. 35 shows the state of the record and the matched account after confirmation of the instruction.

To enable future instructions to be reconciled automatically, when the contributing entity confirms the transaction file, the FMS system undertakes to update the match key fields of the FMS account system. For each matched record in the instruction log, the system checks the match key against the match key field of the account in the FMS account system. Where a discrepancy exists, the match key field of the account system "BB" is overwritten with the record match key "AA" at 346 in FIG. 35. Thus all future instructions for which the same match key is derived will be automatically reconciled with the nominated FMS account.

Figure 36:
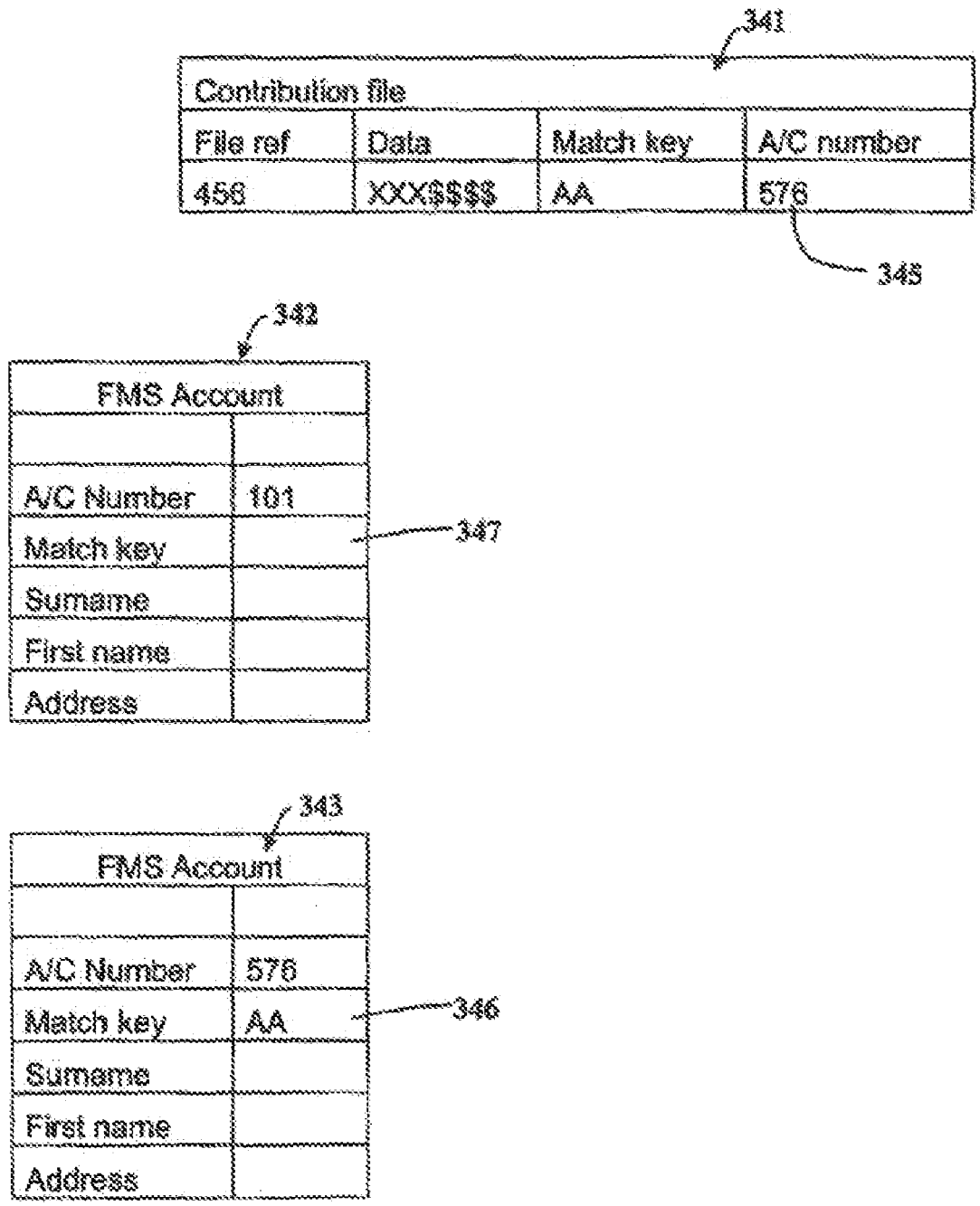
FIG. 36 shows the state of the incorrectly matched account with a blank match key field.

When a new match key is written into the FMS account system, a search is conducted across the remaining FMS accounts (or at least that portion relevant to that employer/paycentre) to determine if that match key exists elsewhere in the system, as would be the case with FMS account 101. Any accounts having an equivalent match key have their match key field deleted. This step ensures that any one match key will map to only a single account of the FMS account system. The final state of the FMS account system is shown in FIG. 36 in which account number "576" now has "AA" stored in the match key field and account number "101" has a blank match key field 347.

Because the step of updating the match key fields of the FMS account system occurs only for the matched records in the instruction log, it is not necessary to delete the account numbers from the account fields of a record when unmatching a record to an account.

The confirmed file is allocated a confirmed status and is able to be processed once payment for the file has been made. To complete the transaction, the individual contribution amounts of the matched records in the transaction log are allocated into the contribution fields of the FMS account identified in the account field of the respective record.

It should be noted that the raw data file submitted by the contributing entity is treated as an integral file and no corrections or alterations are ever made to any of the data fields of the raw data file or any of the internal files derived from the raw data file. The only fields that are written through the process are those pertaining to the match keys. The reason is that the raw data field is generally derived from the payroll files of the contributing entity. For auditing purposes, it is necessary to ensure that the data fields maintained by the host are consistent with those of the contributing entity. Therefore, it is preferable to force the contributing entity to resubmit data requiring amendment in a subsequent file rather than allow the contributing entity to make changes to the data fields of the instructions within the host environment.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A computer-based method of matching a set of instructions received from a submitting entity with a record data set of a receiving entity, said record data set including a plurality of records and an associated match key data set comprising a plurality of match keys, each match key identifying an associated record, the method comprising:

processing, using at least one processor, multiple sets of instructions, each set of instructions of the multiple sets of instructions including an associated match key rule specifying data element fields in each instruction of each set of instructions that permit derivation of match keys for each instruction based on the associated match key rule via combining the data element fields in each instruction;

deriving a match key for an instruction within a particular set of instructions of the multiple sets of instructions using a predetermined match key rule associated with the particular set of instructions, whereby predetermined data element fields in the instruction within the particular set of instructions are combined to derive the match key;

searching said match key data set using the derived match key to identify a record in said record data set thereby automatically matching said instruction to said identified record;

for at least a non-automatically matched instruction, enabling said submitting entity to select a particular record of said record data set, thereby manually matching said non-automatically matched instruction to said particular record; and using a further match key derived from the manually matched instruction to update the match key data set for facilitating the subsequent automatic matching of a later received instruction to the selected record.

2. A method according to claim 1 wherein the updating of the match key data set with the derived match keys of manually matched records enables later instructions providing substantially identical match keys to be automatically matched to their associated records in the record data set.

3. A method according to claim 1 wherein the step of enabling manual matches to be made by the contributing entity is enabled for instructions that are automatically matched in order that the contributing entity may override or mismatch matches that have been automatically matched to allow subsequent manual matching to take place.

4. A method according to claim 1 which includes updating the match key data set independently of the other records in the record data set such that any data fields of a record data set other than a match key field remain substantially unaltered.

5. A method according to claim 1 which includes updating any other records of a record data set independently of the match key data set such that updating of the record data set does not effect the subsequent automatic matching of the later received instructions with said records.

6. A method according to claim 1 wherein a match key associated with a record is stored as a field of the respective record such that the match key data set comprises the match key fields of the data set records, with the match key data set being updated by storing a copy of said derived match key in said match key field of said manually matched record.

7. A method according to claim 1 which includes the step of creating at least some of the match keys in the match key data set by writing match keys derived from the received instructions into the match key data set.

8. A method according to claim 1 which includes generating and presenting to the submitting entity at a user interface instruction status details, including a list of matched and unmatched instructions, for enabling the submitting entity to commence remote manual matching of instructions.

9. A method according to claim 8 which includes enabling all records to be removed from the "unmatched" category to a completed category during the manual matching process, said completed category including matched and ignored categories, and preventing the instruction set from being accepted for further processing until all records have been removed from the "unmatched" category.

10. A method according to claim 1 which includes the step of identifying data errors in the set of instructions and automatically removing those instructions in respect of which data errors exist from the instructions to be matched.

11. A method according to claim 1, wherein the match key data set further comprises a plurality of match key association rules, individual ones of said match key association rules defining a relationship between a match key derived from an instruction and a match key associated with a record, wherein the match key data set is updated by storing an updated association rule between said derived match key and said match key associated with said matched record.

12. A method according to claim 1 which includes prompting said submitting entity to provide search criteria, automatically searching said data set to determine one or more records matching criteria provided by said submitting entity, and prompting said submitting entity to select a record from said determined records.

13. A method according to claim 1 wherein where an instruction is matched to a record selected by said submitting entity, the method further comprises deleting from said match key data set an association of said derived match key with a data set record other than the selected record.

14. A computer-based method of matching a set of instructions received from a submitting entity with a record data set of a receiving entity, said record data set including a plurality of records and an associated match key data set comprising a plurality of match keys, each match key identifying an associated record, the method comprising:
   processing, using at least one processor, multiple sets of instructions, each set of instructions of the multiple sets of instructions including an associated match key rule specifying data element fields in each instruction of each set of instructions that permit derivation of match keys for each instruction based on the associated match key rule via combining the data element fields in each instruction;
   deriving a match key for an instruction within a particular set of instructions of the multiple sets of instructions using a predetermined match key rule associated with the particular set of instructions, whereby predetermined data element fields in the instruction within the particular set of instructions are combined to derive the match key;
   searching said match key data set using the derived match key to identify a record in said record data set thereby automatically matching said instruction to said identified record;
   for at least a non-automatically matched instruction, enabling said submitting entity to select a particular record of said record data set, thereby manually matching said non-automatically matched instruction to said particular record;
   using a further match key derived from the manually matched instruction to update the match key data set for facilitating the subsequent automatic matching of a later received instruction to the selected record; and
   based on a further match key rule being introduced the associated match key rule being modified, writing the further match key rule for the modified associated match key to a new rule for a corresponding match key data set, and a new set of match keys is generated to make up the new match key data set.

15. A computer memory storing instructions that, when executed by a processor, perform a computer-based method of matching a set of instructions received from a submitting entity with a record data set of a receiving entity, said record data set including a plurality of records and an associated match key data set comprising a plurality of match keys, each match key identifying an associated record, the method comprising:
   receiving the set of instructions submitted by the submitting entity in a format characteristic of the particular submitting entity;
   converting the received set of instructions into a format compatible with the record data set in accordance with a set of mapping rules defined by the format characteristic of the submitting entity, prior to match keys being derived;
   searching said match key data set using a match key derived from a received instruction to identify a record in said record data set thereby automatically matching said received instruction to said identified record for at least a non-automatically matched instruction, enabling said submitting entity to select a particular record of said record data set, thereby manually matching said non-automatically matched instruction to said selected record; and
   using a further match key derived from a manually matched instruction to update the match key data set for facilitating the subsequent automatic matching of a later received instruction to the selected record.

16. A computer memory storing instructions that, when executed by a processor, perform a computer-based method of matching a set of instructions received from a submitting entity with a record data set of a receiving entity, said record data set including a plurality of records and an associated match key data set comprising a plurality of match keys, each match key identifying an associated record, the method comprising:
   receiving the set of instructions submitted by the submitting entity in a format characteristic of the particular submitting entity;
   converting the received set of instructions into a format compatible with the record data set in accordance with a set of mapping rules defined by the format characteristic of the submitting entity, prior to match keys being derived;
   searching said match key data set using a match key derived from a received instruction to identify a record in said record data set thereby automatically matching said received instruction to said identified record for at least a non-automatically matched instruction, enabling said submitting entity to select a particular record of said record data set, thereby manually matching said non-automatically matched instruction to said selected record; and
   using a further match key derived from a manually matched instruction to update the match key data set for facilitating the subsequent automatic matching of a later received instruction to the selected record
   wherein the mapping rules are variable in response to variations in format made by the submitting entity.

17. A method according to claim 16 wherein the set of instructions is in the form of payment instructions for making multiple payments, the record data set is a set of accounts into which the payments are to be made on a regular basis.

18. A method according to claim 17 which includes calculating in real time the balance due in respect of an aggregate of matched accounts on the basis of available funds and enabling payment of said balance to be made.

19. A system for matching a set of instructions received from a submitting entity with a record data set included within at least one database of a receiving entity, said record data set including a plurality of records and an associated match key data set comprising a plurality of match keys, each match key identifying an associated record in the record data set, the system comprising:
   a processor-implemented match key derivation means for deriving a match key from an instruction;
   a processor-implemented search engine for searching the at least one database using said derived match key to identify a record in said record data set thereby automatically matching said instruction to said identified record;

a processor-implemented selection means for enabling said submitting entity to select a further instruction and manually match it to a selected record;

a processor-implemented updating means for using a match key derived from a manually matched instruction to facilitate subsequent automatic matching of a later instruction with a record in the record data set, the processor-implemented updating means including means for updating the match key data set independently of the other records in the record data set such that any data fields of a record data set other than a match key field remain substantially unaltered, and including means for updating any other records of a record data set independently of the match key data set such that updating of the record data set does not affect the subsequent automatic matching of the later received instructions with said records; and at least one processor to implement one or more of the processor-implemented match key derivation means, "the processor-implemented search engine," the processor-implemented match key selection means, and the processor-implemented updating means.

20. A system according to claim 19 wherein the selection means includes means for enabling overriding or mismatching of matches that have been automatically matched to allow subsequent manual matching to take place.

21. A system according to claim 19 wherein the updating means includes means for updating the match key data set with the derived match keys of manually matched records to enable later instructions providing substantially identical match keys to be automatically matched to their associated records in the record data set.

22. A system according to claim 19 which includes a memory for storing a match key associated with a record as a field of the respective record such that the match key data set comprises the match key fields of the data set records, with the match key data set being updated by storing a copy of said derived match key in said match key field of said manually matched record.

23. A system according to claim 19 which includes processing means for processing multiple sets of instructions, and storage means for storing each instruction set and an associated match key rule specifying the data element fields in the instruction to be combined for that instruction set.

24. A system according to claim 23 which includes match key rule writing means for enabling a match key rule to be written to a new rule for the corresponding match key data set in the event of a match key rule being introduced or modified for a particular instruction set, and match key generation means for generating a new set of match keys to make up a new match key data set.

25. A system according to claim 19 which includes means for creating at least some of the match keys in the match key data set by writing match keys derived from the received instructions into the match key data set.

26. A system according to claim 19 in which the selection means includes means for generating and presenting to the submitting entity at a user interface instruction status details, including a list of matched and unmatched instructions, for enabling the submitting entity to commence remote manual matching of instructions.

27. A system according to claim 26 in which the selection means includes means for enabling all records to be removed from the "unmatched" category to a completed category during the manual matching process, said completed category including matched and ignored categories, and means for preventing the instruction set from being accepted for further processing until all records have been removed from the "unmatched" category.

28. A system according to claim 19 which includes means for identifying data errors in the set of instructions and automatically removing those instructions in respect of which data errors exist from the instructions to be matched.

29. A system according to claim 19 wherein the search engine includes means for prompting said submitting entity to provide search criteria, means for automatically searching said data set to determine one or more records matching criteria provided by said submitting entity, and means for prompting said submitting entity to select a record from said determined records.

30. A system according to claim 19, which includes means enabling the deletion from said match key data set of an association of said derived match key with a data set record other than the manually selected record.

31. A system according to claim 19 which includes a data transformation engine for transforming a set of instructions in a format characteristic of a particular submitting entity into a format compatible with the record data set in accordance with a set of mapping rules determined by the format of the submitting entity.

32. A system according to claim 31 which includes means for varying the mapping rules in response to variations in format made by the submitting entity.

33. A system according to claim 19 wherein the set of instructions is in the form of payment instructions for making multiple payments, and the record data set is a set of accounts into which the payments are to be made on a regular basis.

34. A system according to claim 19 which includes means for calculating in real time the balance due in respect of an aggregate of matched accounts on the basis of available funds and means for enabling payment of said balance to be made.

* * * * *

UNITED STATES PATENT AND TRADEMARK OFFICE
CERTIFICATE OF CORRECTION

PATENT NO. : 7,630,989 B2 Page 1 of 1
APPLICATION NO. : 10/991091
DATED : December 8, 2009
INVENTOR(S) : Weir et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this

Twenty-first Day of December, 2010

David J. Kappos
*Director of the United States Patent and Trademark Office*